United States Patent
Lassota

(10) Patent No.: US 9,560,863 B1
(45) Date of Patent: Feb. 7, 2017

(54) METHOD OF FOOD PROCESSING USING AN AUTO-DIRECTIVE CONTROLLER

(75) Inventor: Zbigniew G. Lassota, Long Grove, IL (US)

(73) Assignee: FOOD EQUIPMENT TECHNOLOGIES COMPANY, INC., Lake Zurich, IL (US)

( * ) Notice: Subject to any disclaimer, the term of this patent is extended or adjusted under 35 U.S.C. 154(b) by 1217 days.

(21) Appl. No.: 12/608,559

(22) Filed: Oct. 29, 2009

Related U.S. Application Data

(62) Division of application No. 10/631,118, filed on Jul. 31, 2003, now Pat. No. 7,631,593.

(60) Provisional application No. 60/399,916, filed on Jul. 31, 2002.

(51) Int. Cl.
*A23F 5/00* (2006.01)
*A47J 31/00* (2006.01)
*A23F 5/26* (2006.01)

(52) U.S. Cl.
CPC .............. *A23F 5/26* (2013.01); *A47J 31/002* (2013.01)

(58) Field of Classification Search
CPC .......... A47J 31/002; A47J 31/00; A47J 31/52; A23F 5/26
USPC .. 99/280, 281, 282, 283, 284, 279; 426/433; 345/170, 173, 176; 340/407.1, 340/815.47, 815.48
See application file for complete search history.

(56) References Cited

U.S. PATENT DOCUMENTS

| | | | |
|---|---|---|---|
| 5,054,382 A | 10/1991 | Ward et al. ...................... 99/327 |
| 5,539,429 A * | 7/1996 | Yano et al. .................... 345/173 |
| 6,095,031 A | 8/2000 | Warne ............................. 99/282 |
| 6,414,674 B1 | 7/2002 | Kamper et al. ............... 345/173 |
| 6,529,125 B1 | 3/2003 | Butler et al. ................... 340/461 |
| 6,546,435 B1 | 4/2003 | Yoshimura et al. .............. 710/4 |
| 6,586,714 B2 | 7/2003 | Kawamura et al. .......... 219/711 |
| 6,630,928 B1 | 10/2003 | McIntyre et al. ............. 345/173 |
| 6,752,069 B1 | 6/2004 | Burke et al. .................... 99/280 |
| 6,933,474 B2 | 8/2005 | Shukla et al. ................. 219/487 |
| 7,186,955 B2 | 3/2007 | Fisher et al. .................. 219/486 |
| 7,455,867 B1 * | 11/2008 | Gutwein et al. .............. 426/594 |
| 2003/0050117 A1 | 3/2003 | Silva et al. ..................... 463/36 |
| 2003/0079612 A1 * | 5/2003 | Con ................................ 99/275 |
| 2003/0109938 A1 | 6/2003 | Daum et al. .................... 700/11 |

\* cited by examiner

*Primary Examiner* — Reginald L Alexander
(74) *Attorney, Agent, or Firm* — James W. Potthast; Potthast & Associates

(57) ABSTRACT

A method of controlling a hot beverage brewer (20) with an auto-directive brewer controller (22) that controls enabling and revealing of a plurality of hidden, or phantom, switches (39, 40, 42, 48, 50, 52, 54, 56, 58 and 60). Signals from disabled switches are ignored by a microcomputer (24), and the operator is directed to only the hidden switches that are enabled by selectively revealing them with individually associated backlights (39', 40', 42', 48', 50', 54', 56', 58', and 60'). When the backlights are energized the location of the hidden switches is revealed by the light passing through a dark, but semi-translucent, flexible, plastic control panel that overlies the hidden switches and their associated backlights. Different modes of normal operation may be preselected during a program mode (FIG. 12D) in which one or more of the brew start switches are relatively permanently disabled and remain relatively permanently hidden, while other ones of the start brew switches and other function selection switches are only temporarily disabled and temporarily hidden due to changing conditions or status of the brewer during normal operation.

42 Claims, 17 Drawing Sheets

ERROR CODES

| CODE | DESCRIPTION | POSSIBLE CAUSE | CORRECTIVE ACTION | HOW TO CLEAR ERROR CODES | |
|---|---|---|---|---|---|
| | | | | SOFTWARE VER. 1.51 AND LOWER | SOFTWARE VER. 2.0 AND HIGHER |
| 001 | INTERNAL ERROR SYSTEM HAD TO RELOAD DEFAULT SETTINGS. | CONTROL BOARD FAILURE. | CLEAR ERROR. RE-PROGRAM THE BREWER TO THE DESIRED SPECIFICATIONS. IF ERROR OCCURS AGAIN, REPLACE CONTROL BOARD. | ENTER PROGRAMMING MODE, THEN EXIT PROGRAMMING MODE. | TURN MAIN POWER SWITCH OFF AND ON. |
| 002 | POWER FAILURE POWER STATE DOES NOT MATCH FEEDBACK LOOP STATE. | RELAY ON CONTROL BOARD HAS FAILED. | REPLACE CONTROL BOARD. | ENTER PROGRAMMING MODE, THEN EXIT PROGRAMMING MODE. | TURN MAIN POWER SWITCH OFF AND ON. |
| 050 | SHORTED TEMPERATURE PROBE. | PROBE FAILURE. | REPLACE PROBE. | ENTER PROGRAMMING MODE, THEN EXIT PROGRAMMING MODE. | TURN MAIN POWER SWITCH OFF AND ON. |
| 051 | OPEN TEMPERATURE PROBE. | BAD PROBE CONNECTION, OR PROBE FAILURE. | CHECK ALL CONNECTIONS. REPLACE PROBE IF NECESSARY. | ENTER PROGRAMMING MODE, THEN EXIT PROGRAMMING MODE. | TURN MAIN POWER SWITCH OFF AND ON. |

FIG. 13A

| | | | | |
|---|---|---|---|---|
| 075 | BREW BASKET LOCK OR SENSOR FAILURE. BASKET WAS IN PLACE WHEN BREW CYCLE STARTED, BUT WAS PULLED OUT DURING THE BREW CYCLE. IF THIS ERROR OCCURS, THE BREW BASKET LOCK HAS FAILED OR THE SENSOR IS OUT OF ADJUSTMENT. | BREW BASKET LOCK HAS FAILED OR SENSOR NEEDS ADJUSTMENT. | REPAIR OR REPLACE BREW BASKET LOCK, OR ADJUST SENSOR. | PRESS THE FLASHING CONTROL PANEL POWER SWITCH TO RESUME OPERATION. | PRESS THE FLASHING CONTROL PANEL POWER SWITCH TO RESUME OPERATION. |
| 100 | INITIAL FILL ERROR INITIAL FILL TIME WAS MORE THAN 8.6 MINUTES. | WATER SUPPLY FLOW RATE IS TOO LOW | WATCH FOR SHORT POTTING DURING BREW CYCLE. INVESTIGATE CAUSE OF LOW FLOW RATE. (CLOGGED WATER FILTER ETC.) | PRESS THE CONTROL PANEL POWER SWITCH. | PRESS THE CONTROL PANEL POWER SWITCH. |
| 101 | ERROR ON REFILL. TANK DID NOT REFILL WITHIN 2 MINUTES. | WATER SUPPLY FLOW RATE IS TOO LOW | WATCH FOR SHORT POTTING DURING BREW CYCLE. INVESTIGATE CAUSE OF LOW FLOW RATE. (CLOGGED WATER FILTER ETC.) | ERROR MESSAGE IS CLEARED AUTOMATICALLY AT END OF BREW CYCLE. | ERROR MESSAGE IS CLEARED AUTOMATICALLY AT END OF BREW CYCLE. |
| 102 | UNWANTED FILL WHEN BREWER IS IDLE, THE FILL VALVE WAS ACTIVATED FOR MORE THAN 30 SECONDS DURING A 1 HOUR PERIOD. | POSSIBLE LEAK IN TANK, FITTING, OR VALVE. OUTPUT ON CONTROL BOARD HAS FAILED, CAUSING A DISPENSE VALVE TO OPEN. | CHECK INSIDE OF MACHINE FOR LEAKS. REPLACE CONTROL BOARD. | ENTER PROGRAMMING MODE, THEN EXIT PROGRAMMING MODE. | TURN MAIN POWER SWITCH OFF AND ON. |

FIG. 13B

| | | | | |
|---|---|---|---|---|
| 200 | FLAT LINE TEMPERATURE (WATER IS BOILING) SYSTEM IS CALLING FOR HEAT, BUT THE TEMPERATURE DOES NOT RISE AT LEAST 2°F WITHIN 5 MINUTES. | MERCURY RELAY IS STUCK CLOSED, BAD OUTPUT ON CONTROL BOARD, OR TEMPERATURE IS SET TOO HIGH FOR ALTITUDE. | CHECK MERCURY RELAY, CHECK CONTROL BOARD OUTPUT, OR ADJUST TEMPERATURE FOR ALTITUDE. | ENTER PROGRAMMING MODE, THEN EXIT PROGRAMMING MODE. | TURN MAIN POWER SWITCH OFF AND ON. |
| 201 | HEATER OPEN SYSTEM IS CALLING FOR HEAT, BUT THE TEMPERATURE DOES NOT RISE AT LEAST 2°F WITHIN 10 MINUTES. THIS ERROR IS DISABLED DURING BREWING AND WHILE USING THE HOT WATER FAUCET. | HEATING ELEMENT FAILURE. | CHECK AND REPLACE HEATING ELEMENTS IF NECESSARY. | ENTER PROGRAMMING MODE, THEN EXIT PROGRAMMING MODE. | TURN MAIN POWER SWITCH OFF AND ON. |
| 202 | HEATER SHORT SYSTEM IS NOT CALLING FOR HEAT, BUT TEMPERATURE RISES MORE THAN 5°F. | POSSIBLE MERCURY RELAY STUCK CLOSED, OR BAD OUTPUT ON CONTROL BOARD. | CHECK MERCURY RELAY AND CONTROL BOARD. | ENTER PROGRAMMING MODE, THEN EXIT PROGRAMMING MODE. | |
| 255 | KEYPAD ERROR A SWITCH WAS PRESSED FOR MORE THAN 45 SECONDS. | SWITCH WAS HELD IN TOO LONG, OR SWITCH IS STUCK CLOSED. | CLEAR ERROR AND TRY AGAIN. IF ERROR OCCURS WITHOUT SWITCH BEING PRESSED, REPLACE INPUT BOARD. | ENTER PROGRAMMING MODE, THEN EXIT PROGRAMMING MODE. | TURN MAIN POWER SWITCH OFF AND ON. |

FIG. 13C

METHOD OF FOOD PROCESSING USING AN AUTO-DIRECTIVE CONTROLLER

CROSS-REFERENCE TO RELATED APPLICATION

This application is a divisional of and claims the benefit under 35 U.S.C. 120 of application Ser. No. 10/631,118 filed Jul. 31, 2003 now U.S. Pat. No. 7,631,593, which, in turn, claims the benefit under 35 USC 119(e) of U.S. provisional patent application Ser. No. 60/399,916, filed Jul. 31, 2002, of the present inventor, entitled "Coffee Brewer Assembly with Auto-Corrective Controller with Phantom Control Panel and Method".

BACKGROUND OF THE INVENTION

Field of the Invention

The invention generally relates to a method of operating food processing equipment, such as an electrical beverage brewer, coffee brewer or tea brewer, and, more particularly, to operating such food processing equipment that has a plurality of manually actuatable function control switches for controlling the operations of the food processing apparatus.

Discussion of the Prior Art

Food processing equipment such as electrical coffee brewers, tea brewers, food grinders, hot water boilers, or dispensers, and the like that are electrically powered and have an operator control panel from which the operator interfaces with various operational elements of the apparatus in order to manually control the operation of the apparatus is well known. In the case of known beverage brewers, a plurality of brewer functions are respectively controlled by a plurality of associated brewer function selection switches. For instance in a single brewer, it is known to have at least one start brew cycle switch, an emergency stop brew switch, a hot water dispense switch, and full-power switch. It is also known to provide on the operator control panel a message display screen for displaying brewer status information and programming information.

When the power switch is actuated, electrical power is applied to a heating element to heat water in a hot water reservoir. After the hot water has come up to a preselected temperature and the level is at a preselected level, a brew water valve, or brew valve, is opened to pass the hot water from the hot water reservoir to a spray head. Hot water is sprayed onto the top surface of a layer of ground coffee or the like that is held within filter paper within a brew basket. The hot water passes through and dissolves some of the coffee constituents of the ground coffee during the hot water dispense period of the brew cycle to make the brewed coffee beverage. The brewed coffee passes from the brew basket into a suitable container for service or storage.

After a preselected time, corresponding to a preselected quantity of hot water and of brewed beverage, the brew valve automatically closes. The brew cycle, however, continues until the last of the hot water that was added to the brew basket passes through the coffee grounds and out of the bottom of the brew basket and into an urn or the like during the drain period, or drip period of the brew cycle.

Some of the control switches are logically disabled or have no function during different status conditions of the brewer. For instance, during the dispense period of the brew cycle, actuation of the brew cycle start switch is ineffective since the dispense valve is already open and the hot water is already being passed to the spray head. During the dispense period, the emergency stop switch, if actuated is effective to close the brew valve and stop the brew cycle. However, after the brew cycle including the drain period is concluded then actuation of the emergency stop switch has no effect because the brew cycle is already concluded, and there is nothing further to stop.

Some switches are artificially disabled at different times. For instance, when there is not brew cycle in progress, the hot water dispense switch, when manually held in an actuated state, maintains the brew valve in an open condition to pass hot water to the spray head. The brew valve remains open only so long as an operator holds the switch in an "on" state, or actuated state. However, during the brew cycle drip period, there is still a filled brew basket beneath the spray head, and the hot water switch is therefore automatically disabled from reopening during this time by a brewer controller that interfaces the switches with the operating elements of the brewer.

Other brewer functions are only used rarely, but, of course, remain on the control panel and can be inadvertently actuated. Initially, during installation of a commercial brewer, after a "full power-on" switch is actuated, a fill valve is opened to fill the hot water reservoir and power is applied to the heating elements in the hot water tank to heat the water, the brewer controller places the brewer into an active state instead of a standby state. After installation, power to the heating elements is generally left on at all times including during closing hours due to relative power efficiencies of so doing versus turning heating element power off and reheating each new day.

Some brewers have the capability of making different amounts of coffee, such as one half gallon, one gallon and one and one half gallon. These different "batch quantities" have a plurality of different start brew cycle switches respectively associated with the different amounts of beverage to be brewed. Depending upon a preselected mode of operation that has been selected for the brewer, any one, any two or all three of the switches may be operational.

In the case of a mode of operation being preselected in which more than one of the start brew cycle switches is operational, the brewer controller responds to actuation of the different start brew switches by keeping the brew valve open for different dispense time periods associated with the different amounts of beverage to be brewed. However, if a brew cycle for a given quantity of beverage has been started by manual actuation of the associated one of the plurality of start brew switches, then all the other start brew switches are disabled from starting a new brew cycle for a different amount of beverage. The one brew cycle start switch that does start the brew cycle is also disabled from restarting the cycle. Upon completion of the brew cycle, then once again all of the operational brew cycle start switches are enabled.

As noted above, during initial setup, one of a plurality of different modes of operation may be selected. For instance in one mode of operation, the brewer start switches for making one half and one gallon are rendered operational so that the controller will respond to their actuation, subject to the temporary disablement during the brewing status of an existing brew cycle in progress. The third brew start switch for making one and one half gallons is rendered relatively permanently nonoperational. It will remain nonoperational until a new mode is preselected in which it is selected to be operational. Even though a switch is relatively permanently nonoperational, in known brewers, the switch remains on the operator control panel and remains visible.

While some control panels have regular push-button switches of the type that protrude through a flat rigid panel, others are known which employ a so-called touch pad assembly. The touch pad assembly employs a sheet of flexible plastic, or "touch pad" that has touch pad switches. The membrane switches are actuated by manually pressing certain switch locations of the touch pad. The touch pad is outwardly marked with the location of all the different switches beneath, and these switch locations are provided with a graphic or other indication of the function associated with the switch location. These graphics or words or letters remain visible even though the switch itself is disabled either permanently, due to disablement associated a particular mode selection, or relatively temporarily disabled in accordance with changing conditions during a brew cycle as noted above.

In the case of relatively permanently disablement, due to preselection of a mode of operation in which one or more brew start switches, or some other potentially functional capability switch, is relatively permanently disabled, it is known to provide different "touch pad" overlays for the different operational modes. The different overlays show only the switch locations of the switches that have been selected to be operational. This disadvantageously requires changing overlays in the field if there is a change in the operational capabilities or operational mode of the brewer in which different switches are rendered operational or nonoperational. In other cases, only a single overlay is used for all levels of operational capability, and all switch locations remain visible at all time even those that are relatively permanently nonoperational due to operational mode preselection.

It is also known to provide such touch pads in association with message display units that are always visible even when not being used to display a message. Often such message display units are only used during programming or during initialization to display messages and are not employed during normal operation.

SUMMARY OF THE INVENTION

It is therefore a principal object of the present invention to provide a method of operating a food processing apparatus, such as a beverage brewer, with an operator control panel that overcomes the disadvantages of known methods in which relatively permanently nonoperational function selection switches, or temporarily disabled function control switches, or the locations of such function control switches, are always visible.

This objective is achieved, in part, by providing for use in a beverage brewer, a method of operating the brewer, by performing the steps of hiding at a control panel a plurality of hidden function selection switches respectively associated with a plurality of different operator selectable brewer functions, preselecting different modes of operation; and selectively revealing only preselected ones of the hidden function switches to an operator in accordance with the mode of operation that has been preselected.

Preferably, some of the plurality of different operator selectable brewer functions include functions of starting brew cycles for making different quantities of beverage, and the different preselected modes of operation are respectively associated with making the different quantities of beverage. The method may also include the steps of hiding other brewer function switches associated with other functions, and selectively revealing the other hidden switches regardless of the different preselected modes operation. With regard to the message display the method may include the steps of hiding the message display, and selectively revealing the message display when needed for display of a message.

Preferably, the control method also includes the steps of associating another brew function with another selection switch that is independent of the different modes of operation, and selectively revealing the at least another hidden function switch in response to a change in operating conditions of the brewer.

The object of the invention is also acquired by providing a method of operating a beverage brewer by performance of the steps of associating a plurality of hidden function selection switches of an operator control panel with a plurality of different operator selectable brewer functions, and selectively revealing through means of a controller only selected ones of the hidden function switches to an operator in accordance with different phases of operation of the brewer.

In one embodiment, some of the plurality of different operator selectable brewer functions includes one or more of the functions of (a) starting different brew cycles for making different quantities of beverage. Preferably, the brewer functions include at least one, if not all, of the functions of (a) a brewer power-on function, (b) a stop brew cycle function, and (c) a water-dispense function and (d) a start-brew function.

In accordance with one aspect of the invention, one of a plurality of different modes of brewing operation is preselected, and the hidden function selection switches that are not associated with any functions performed during the mode of brewing operation that have been selected are relatively permanently disabled. Also, the selectively revealing means is relatively permanently disabled from revealing the relatively permanently disabled function switches that are not associated with any functions of the preselected mode of operation.

If the operator control panel has a message display for displaying information needed for programming the controller, then the method may include the steps of hiding the message display, and selectively revealing the message display when needed for programming. Preferably, the message display is only revealed when there is a message to be displayed.

This objective is also achieved in part by providing a directive manual control method for use in a food processing apparatus for performing a plurality of processes on a food ingredient by performing the steps of covering a plurality of manually operable function switches with a partially translucent, protective, operator control panel forming part of a housing and having an interior side through which the hidden function switches cannot be seen under ordinary ambient light conditions and an exterior side for manual engagement by an operator, associating a plurality of lights with at least one of each of the hidden function switches and located at the interior side of the panel, selecting with a controller ones of the hidden function switches to be revealed to an operator in accordance with a computer program stored in the controller, energizing only the lights associated with the hidden function selection switches selected to be revealed to illuminate portions of the interior side partially translucent panel adjacent the selected function switches, and passing light from the illumination to the exterior of the panel said illumination of to illuminate and thereby indicate at the exterior of the panel the location the one of the function switches selected to be revealed.

Preferably, the method includes the steps of preselecting with means associated with the controller different modes of operation in which different ones of the function switches are not to be used, and relatively permanently disabling the different ones of the function switches not to be used while the associated mode of operation remains preselected. Also, the method preferably includes the step of relatively temporarily disabling with the controller, when in the preselected different modes of operation, different ones of the function switches that are not relatively permanently disabled in response to changing conditions of the apparatus.

The invention thus also provides for use in a beverage brewer an auto-directive method of control by performing the steps of hiding at a control panel a plurality of hidden function selection switches respectively associated with a plurality of different operator selectable brewer functions, preselecting different modes of operation, and selectively revealing only preselected ones of the hidden function switches to an operator in accordance with the mode of operation that has been preselected. Preferably, some of the plurality of different operator selectable brewer functions include functions of starting brew cycles for making different quantities of beverage, and the different preselected modes of operation are respectively associated with making the different quantities of beverage. The method may also include the steps of hiding other brewer function switches associated with other functions, and selectively revealing the other hidden switches regardless of the different preselected modes operation. With regard to the message display the method may include the steps of hiding the message display, and selectively revealing the message display when needed for display of a message.

Preferably, the control method also includes the steps of associating another brew function with another selection switch that is independent of the different modes of operation, and selectively revealing the at least another hidden function switch in response to a change in operating conditions of the brewer.

The objective of the invention is also obtained in part by provision, for use in a beverage brewer, an auto-directive control method by performing the steps of associating a plurality of hidden function selection switches of an operator control panel with a plurality of different operator selectable brewer functions, and selectively revealing through means of a controller only selected ones of the hidden function switches to an operator in accordance with different phases of operation of the brewer. In one embodiment, some of the plurality of different operator selectable brewer functions includes one or more of the functions of (a) starting different brew cycles for making different quantities of beverage. Preferably, the brewer functions include at least one, if not all, of the functions of (a) a brewer power-on function, (b) a stop brew cycle function, and (c) a water-dispense function and (d) a start-brew function.

In accordance with one aspect of the invention, one of a plurality of different modes of brewing operation is preselected, and the hidden function selection switches that are not associated with any functions performed during the mode of brewing operation that have been selected are relatively permanently disabled. Also, the selectively revealing means is relatively permanently disabled from revealing the relatively permanently disabled function switches that are not associated with any functions of the preselected mode of operation.

If the operator control panel has a message display for displaying information needed for programming the controller, then the method may include the steps of hiding the Message display, and selectively revealing the message display when needed for programming. Preferably, the message display is only revealed when there is a message to be displayed.

BRIEF DESCRIPTION OF THE DRAWINGS

The advantageous features of the invention will be described with reference to the several figures of the drawing, in which:

FIGS. 13A, 13B and 13C form a composite chart of error codes and directions to clear the error codes.

DETAILED DESCRIPTION

Figure 1:
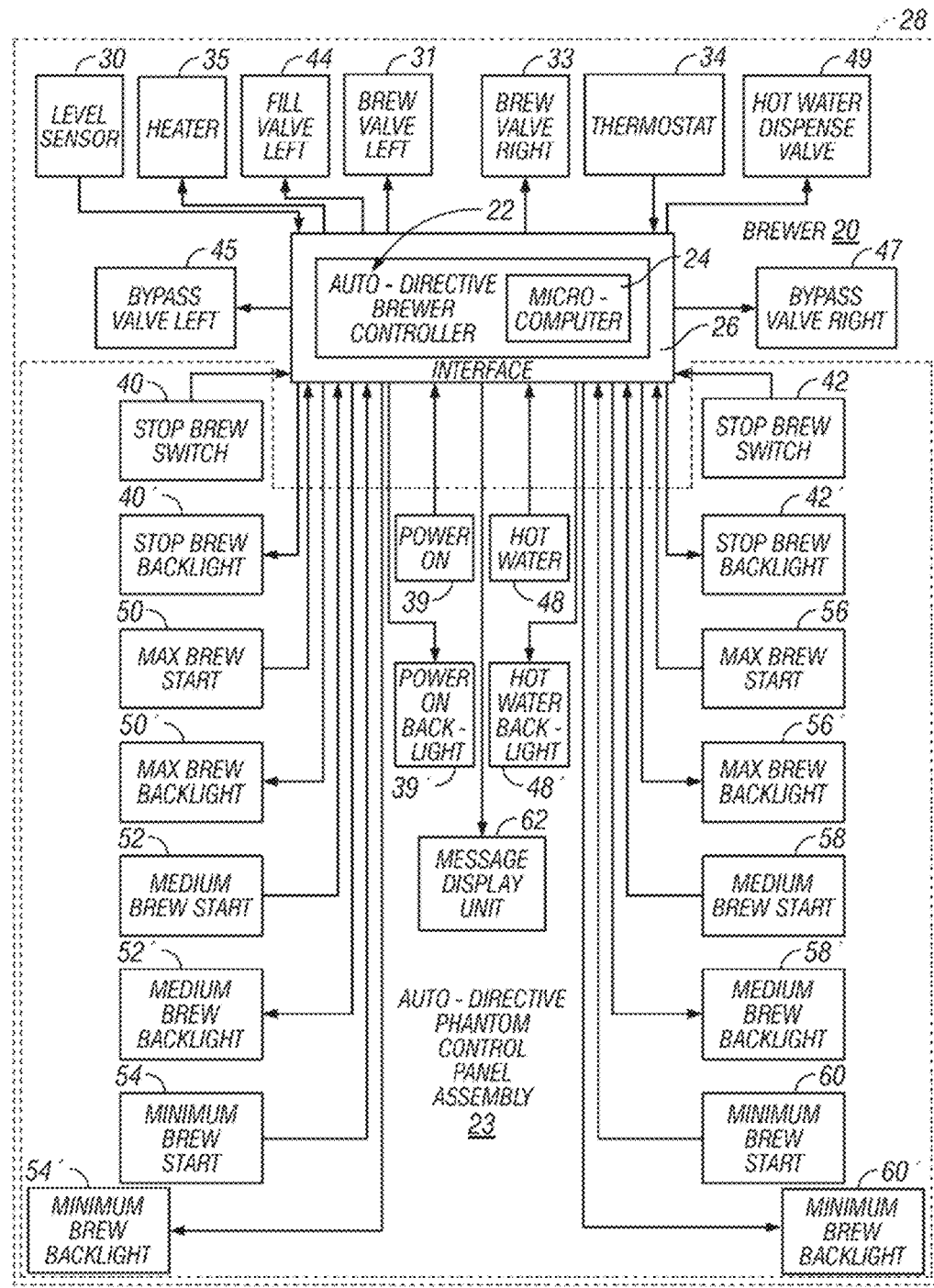
FIG. 1 is a functional block diagram of the preferred embodiment of the brewer of the present invention.

Referring now to FIG. 1, the preferred embodiment of the beverage brewer 20 is seen to include an auto-directive brewer controller 22 with a microcomputer 24 and an interface circuit 26. The microcomputer is preferably a Model 87C52 made by Phillips, or the like. The interface circuitry is conventional circuitry that matches the signal levels and power levels between the various other elements of the beverage brewer 20 and the controller 22. A DC power supply converts the AC power to which the brewer is connected to DC levels needed by the microcomputer 24, the interface circuit 26 and other circuit elements including the various switch backlights. The brewer also has conventional mechanical elements such as a housing 28 within which is contained the usual elements such as a hot water reservoir, a brew basket and brew basket mounting assembly, and matching urn for receipt of the brewed beverage. These conventional elements form no part of the present invention, and reference may be made to U.S. Pat. No. 5,000,082 issued to Lassota on Mar. 19, 1991 for "Beverage Maker and Method of Making Beverage"; U.S. Pat. No. 5,331,885 issued to Lassota on Jul. 26, 1994 for "Semiautomatic Beverage Maker and Method"; U.S. Pat. No. 5,943,944 issued to Lassota on Aug. 31, 1999, for "Brewing System with Hot Water Urn Flushing Apparatus"; U.S. Pat. No. 5,953,981 issued to Lassota on Sep. 21, 1999; and patents cited therein, hereby incorporated by reference, for further information concerning such standard features.

The brewer 20 has a plurality of automatic inputs and a plurality of manual inputs. In the case of a dual brewer, the automatic inputs include at least one level sensor 30 for sensing the water level in the single hot water reservoir (not shown) that is shared by both sides. When the water level is sensed to be below a preselected level in hot water reservoir, then a fill valve 44 is opened to add water to the reservoir until another preselected maximum level is reached and the fill valve 44 is then automatically closed by the microcomputer 24. A thermostat 34 detects the temperature of the water in the hot water reservoir. When the temperature of the water in the reservoir is sensed to be below a preselected temperature, then an electrical heater 35 is energized to heat the water until another preselected maximum temperature is reached. When the preselected maximum temperature of the hot water in the reservoir is reached, then the computer automatically de-energizes the heater 34.

The manual inputs to the microcomputer 24 are from the hidden brewer function switches of a manual operator phantom control panel assembly 23. A left stop switch 40 and a right stop switch 42 provide inputs to the microcomputer 24 to stop a brew cycle in progress on the left side of the brewer and the right side of the brewer, respectively. If the brew cycle is in the hot water dispense period when hot water from the reservoir is being passed to the brew basket, when the left stop brew switch 40 and the right stop brew switch 40 are actuated, then a left brew valve 44 and a right brew valve 46 are closed to stop further dispense of the hot water and to terminate the brew cycle. In addition, the left bypass valve 45 and the right bypass valve, if open during the brew cycle, are automatically closed in response to actuation of the left stop brew switch 40 and the right stop brew switch 42, respectively. In addition, the timers that measure the length of time that the brew valves are kept open during the dispense periods are reset to zero.

On the other hand, while a hot water dispense switch 48 is held in an actuated state, the hot water dispense valve 49 is opened to pass hot water through a hot water outlet (not shown). As soon as the hot water dispense switch is released, the brew valve is caused to close.

There are three start brew switches for each side of the dual brewer, or a total of six. For the left side of the brewer, there is a maximum quantity brew start switch 50, a medium quantity brew start switch 52 and a minimum quantity brew start switch 54. Similarly, for the right side of the brewer, there is a maximum quantity start brew switch 56, a medium quantity start switch 58 and a minimum quantity brew switch 60. The exact batch quantities associated with each of these switches is selectable during the program mode. The operator control panel assembly also includes a message display unit 62.

Each of the brew function selection switches has an associated backlight that is selectively lit by the microprocessor 24 to reveal, when selectively energized, the associated switch location. Preferably, icons are provided at the interior surface of the panel 66 such that when the associated backlight is energized, the light passes through a transparent switch actuator and through the transparent or translucent panel 66 to reveal the silhouette of the associated icon. The icon, being at the interior surface of the overlay panel 66 cannot be seen through the thickness of the panel 66 under normal light conditions such as prevail in such places that such commercial brewers are used. Preferably, the panel is translucent, rather than transparent, but as will be explained below, the backlights are light dispersive and isolated such that a transparent panel could be used, and might otherwise be suitable even without a dispersive light source. Therefore, to reduce wordiness, only the word translucent will be used to describe the light transmission properties of the panel, or overlay, 66 here and in the claims with the understanding that the term is intended to include the meaning of transparent as well as the regular meaning of translucent.

When the translucent panel 66 is exterior surface is pressed inwardly at the location of the back-lighted icon, the switch actuator is pressed inwardly by the opposite interior surface of the panel 66 to actuate the switch. Brewer function switches 39, 40, 42, 50, 52, 54, 56, 58, and 60 have associated backlights 39', 40', 42', 50', 52', 54', 56', 58', and 60', respectively. As will be made apparent, they are not integrated into a touch pad but are entirely distinct from the panel 66, which enables the use of better and brighter light sources and the use of sturdier and more reliable switches.

Figure 2:
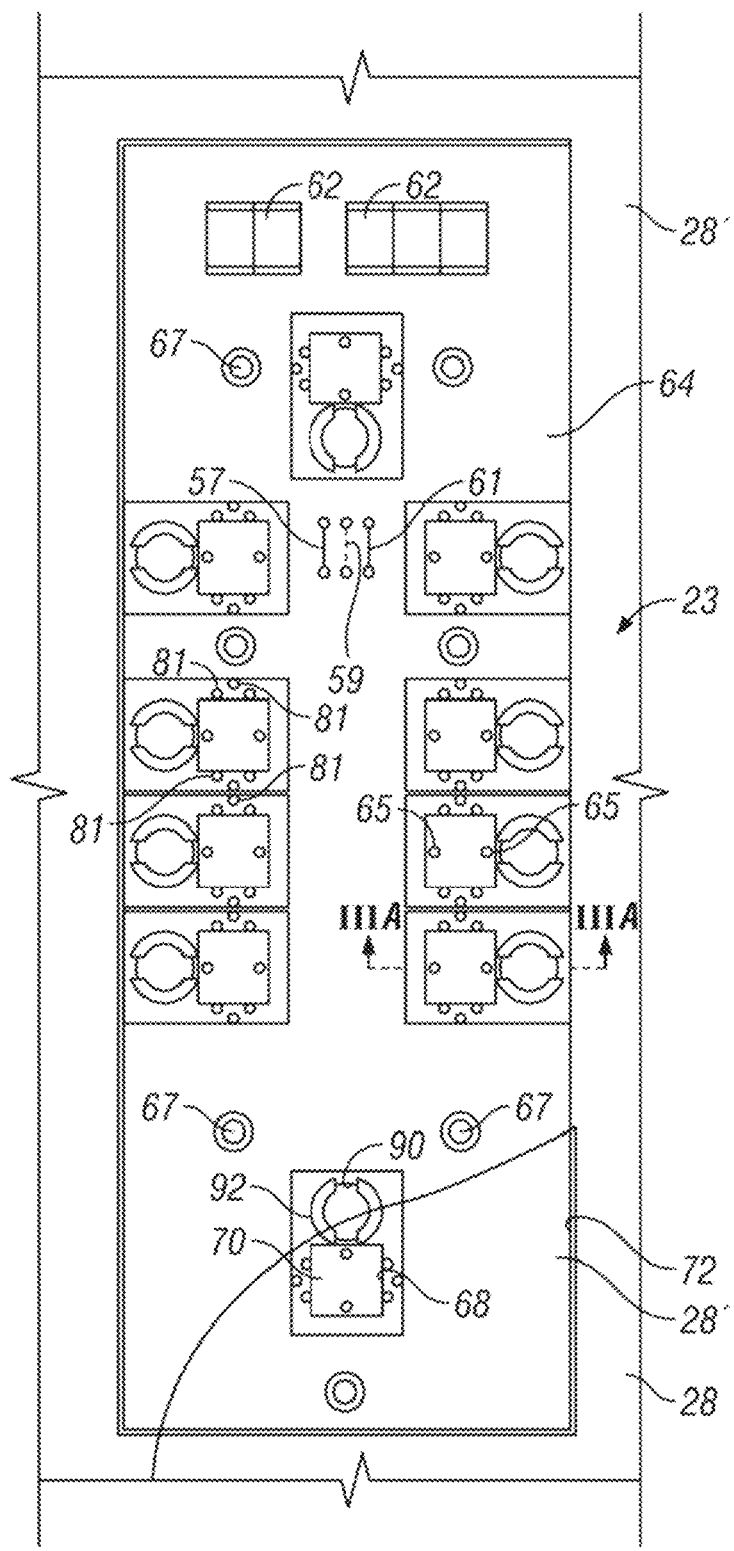
FIG. 2 is a side elevation view of an underlying control panel board of a control panel assembly constructed in accordance with the present invention and showing the hidden brewer function control switches and associated switch revealing back lights, and the message display unit, shown in functional block form in FIG. 1.
Figure 3A:
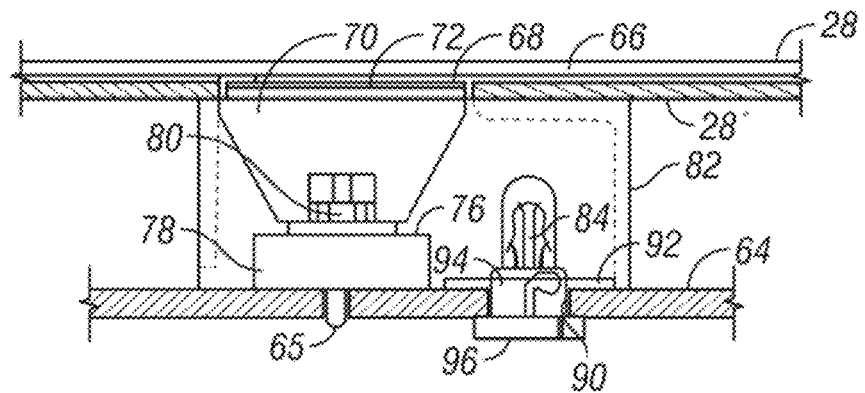
FIG. 3A is a sectional side view of one of the hidden switch assemblies taken along section line IIIA-IIIB of FIG. 2.
Figure 3B:
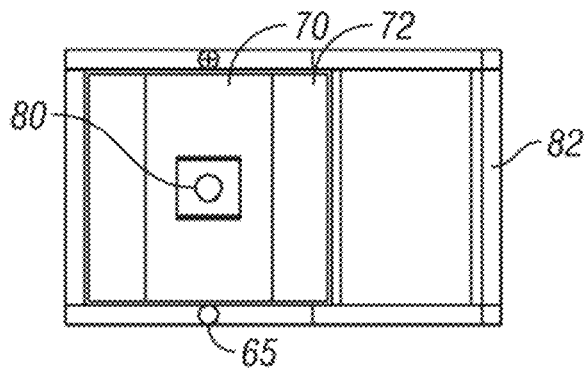
FIG. 3B is a is a plan view of the hidden switch assembly of FIG. 3A.
Figure 3C:
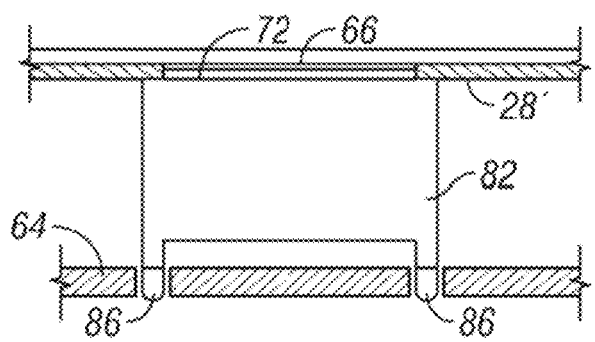
FIG. 3C is an end view of the hidden switch assembly of FIG. 3A.
Figure 3D:
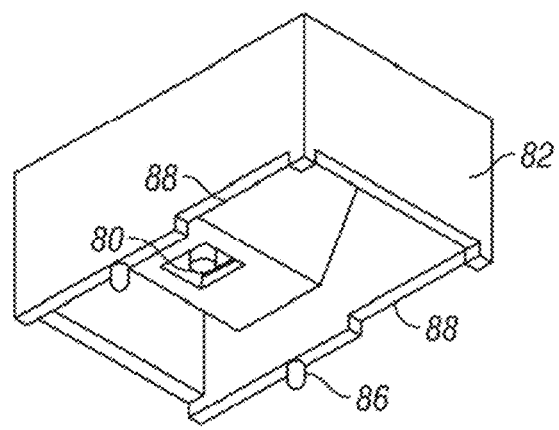
FIG. 3D is a perspective view showing the underside of hidden switch assembly with the switch actuator installed of the hidden switch assembly of FIGS. 3A-3C.
Figure 4A:
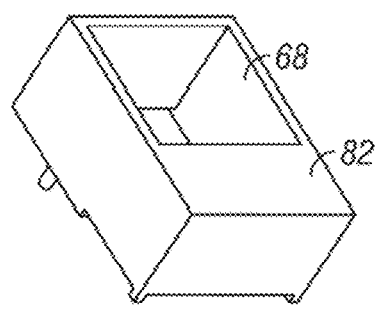
FIG. 4A is another perspective view but showing the assembly with the translucent switch actuator shown in FIGS. 3A-3C removed.
Figure 4B:
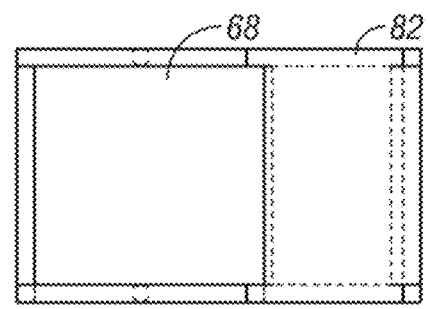
FIG. 4B is a plan view of the light pipe holder of FIG. 4A.
Figure 4C:
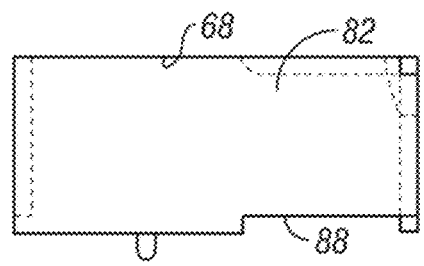
FIG. 4C is a side view of the light pipe holder of FIG. 4B.
Figure 4D:
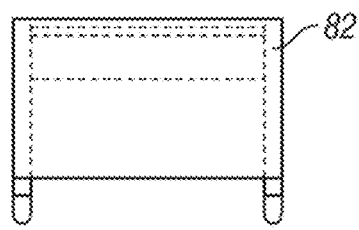
FIG. 4D is an end view of the light pipe holder of FIG. 4C.
Figure 5:
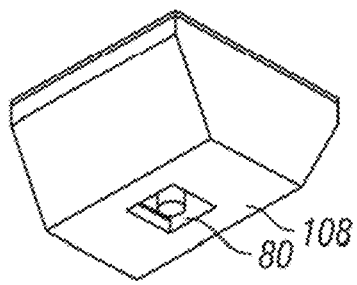
FIG. 5 is a perspective view of the underside of the light pipe hidden function switch actuator that is mounted for movement within the light pipe holder of the hidden switch assembly of FIGS. 3A-3B.
Figure 6A:
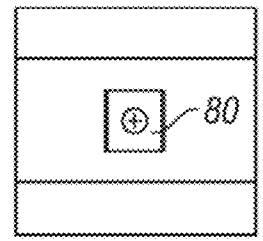
FIGS. 6A, 6B and 6C are respectively a plan view, a side view and an end view of the hidden function switch actuator of FIG. 5.
Figure 6B:
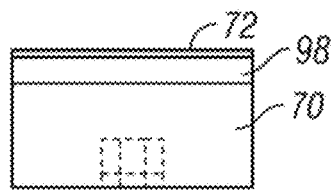
Figure 6C:
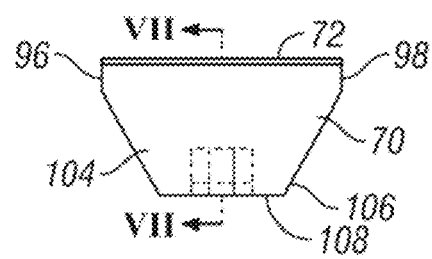
Figure 7:
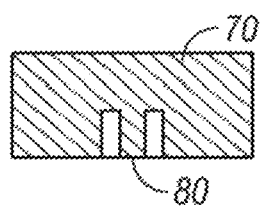
FIG. 7 is a sectional side view of the hidden switch actuator taken through section line VII-VII of FIG. 6C.

Referring to FIGS. 2 and 3A, in a preferred embodiment of the phantom control panel assembly 23, the hidden brew function switches 40, 42, 48, 50, 52, 54, 56, 58 and 60 and the message display unit 62 are mounted to a control panel circuit board 64 which, in turn, is mounted within the housing 28. Referring briefly also to FIG. 10 and FIGS. 11A-11D, the control panel circuit board 64 and all of the elements are protectively hidden beneath a control panel 66 made of a flexible, resilient, semi-transparent piece of plastic, such as polycarbonate. More specifically, the control panel 66 is preferably made of velvet or gloss polycarbonate and has a coefficient of transparency of 30-40% and a thickness of approximately 0.010 inch. This has been found by experimentation to be a thickness that enables the desired resiliency for a suitable feel for actuating the switches that is neither too difficult nor too easy, while providing a degree of translucency that virtually eliminates viewing anything beneath the panel 66 unless back-lit in accordance with the present invention.

Also, mounted to the circuit board 64 are three straps to provide a binary code representative of the particular model in which the board is installed to the microcomputer 24 which may be a plug-in unit for facilitating repairs in the field. The code is binary with a binary zero being represented by a broken strap that may be cut in the field with wire cutters, and a binary one is represented by a strap that has not been cut or broken. Thus, if strap 59 was cut but the other two were not, then the code would be 101 for model number five. Based on this code the computer will disable those functions with which model number five is not provided. This enables a single computer to be used on a plurality of different brewer models without the need for special programming in the field, for the computer self-programs itself based on the binary code represented by the straps 57, 59 and 61.

The control panel 66 is mounted to the housing 28 and supported in overlying relationship with respect to all of the hidden brewer function selection switches. The hidden brewer function selection switches and the message display unit 62 are hidden behind the control panel 66. The panel is only partially translucent, or partially transparent, such that the hidden function switches and the message display unit 62 cannot be seen under ordinary ambient light conditions. The brewer controller 22 and the control panel board include means for selectively revealing the locations of the switches by selectively lighting the partially translucent control panel 66 beneath the panel 66 and adjacent to, or preferably precisely at the location of the hidden function switches that are selected to be revealed. The message display unit 62 is an LED display and is only seen when the LED's are lit to provide a message.

The brewer function selection switches are push button switches, and the partially translucent control panel 66 is sufficiently flexible to enable actuating the push button brewer function switches by pushing against the panel 66 opposite the switches to press the panel 66 against the push button switches. The pushbutton switches have associated means for carrying, the associated backlights. Preferably, there is a separate light source for each of the brewer function switches. Each of the separate light sources is preferably a long lasting incandescent lamp. Alternatively, light emitting diodes are used to back light the switches.

Referring to FIGS. 2 and 3A; the control panel circuit board 64 is located beneath an opaque, protective metal cover plate 28 that forms a portion of the housing 28. The plate 28 is mounted to the board 64 in spaced parallel relationship by means of seven substantially identical mounting posts 67. The mounting posts 67 extend upwardly from the board 64 and provide underlying support for the protective cover plate 28'. The cover plate 28' has congruent, closely fitting cutouts, or mounting holes, 68 for receipt of each of a plurality of brewer, function selection, push button, light transmitting actuators 70 and, likewise, is fitted substantially flush within a congruent mounting hole 72 in the housing 28.

As best seen in FIG. 3A, a top surface 72 of the light transmitting actuator 70 is substantially flat and is positioned within the opening 68 with its flat top surface 72 substantially flush with the surface of the cover plate 28'. The bottom of the light transmitting actuator 70 is releasably attached to the top switch actuation surface 76 of a micro membrane switch 78 by a pair of mating male and female connectors 80. The bottom of the switch is mounted to the printed circuit board 64 by means of a pair of pins 65 received within a mating pin holes in the board 64, also seen in FIG. 2. As seen in FIG. 2, electrical contact is made with the printed circuit board 64 by means of four metal pin terminals 81 that are received within four mating terminal pin holes and soldered to the printed circuit (not shown) on the board 64. The circuit board 64, in turn, has electrical conductivity paths on its surface and connectors at its edge to make contact between the switches and the display with the computer interface 22 and computer 24.

When the actuator surface 72 is pressed downwardly the switch actuation surface 76 is pressed downwardly. All of the brewer function switches are substantially identical, contact switches, and when actuated, internal contacts within the switch body are closed. When the light transmitting actuator 70 is released, the switch membrane resiliently returns to its original position and pushes the switch actuator 70 upwardly until the top surface is returned to a flush relationship with the protective panel 28'. All these brewer function switches are preferably Model B3 W-4055 switches made by OMRON. For purposes that will be made apparent with respect to the stop function switch and the hot water dispense switch, the contacts within the switch remain in contact so long as the actuator is manually held in an actuated state.

Referring now also to FIGS. 3C, 3B, 3D and 4A-4D, each of the switches 78 and the light transmitting switch actuators 70 are contained within an opaque switch housing 82 with an open rectangular top opening at one end for snug receipt of the top surface 72 of the light transmitting actuator 70. As best seen in FIG. 3A, the other end of the opaque switch assembly housing 82 covers an incandescent lamp, or light bulb, 84. The open bottom 86 of the housing 82 is releasably mounted to the card 64 by means of a pair of pins 86. The open bottom 86 is closed by the top surface of the card 64 except for a pair of ventilation cutouts 88 in opposite sides adjacent the bottom 86.

Figure 8A:
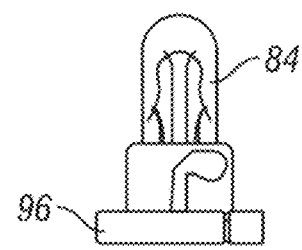
FIG. 8A is an enlarged side view one of the long life, high intensity incandescent lamps previously shown in FIG. 3A.
Figure 8B:
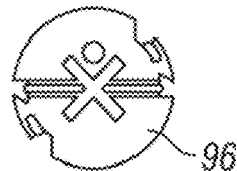
FIG. 8B is a bottom view of the incandescent lamp of FIG. 8A.
Figure 9:
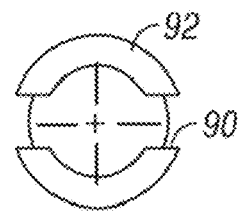
FIG. 9 is a plan view of the lamp mounting cutout in the panel of FIG. 3A.

The lamp 84, also seen in FIGS. 8A and 8B, is passed trough a lamp mounting hole 90, FIGS. 2 and 3A, and the metal base has a leading portion 94 releasably locked to electrical connectors 92, also seen in FIG. 9. The electrical connectors are arcuate and partially surround the hole 90, and another part 96 is pressed into electrical contact against another electrical contact on the underside of the card. The lamp 84 is preferably a long life incandescent bulb having a power of one watt, a voltage of thirteen volts DC, an initial luminosity of 0.30 MSCP and an expected life of 50,000 hours. Preferably, the lamp 84 is a Model IFL-NE514080 made by LUMEX.

Referring now to FIGS. 5, 6A, 6B, 6C and 7, the light transmitting actuator 70 is made of clear acrylic plastic. The flat top 72 is roughened or abraded to cause light diffusion as the light leaves the surface 72. Parallel side walls 96 and 98, parallel end walls 100 and 102, inwardly tapered walls 104 and 106 and the bottom 108 are all smooth to maximize light transmission from the lamp 84 into the transparent body of the actuator 70. The light from the lamp 84 is maintained within the housing 82 to prevent it from being seen at locations other than at the top surface 72 of the associated actuator 70. When the lamp 84 is energized, the light within the housing reflects off the interior walls of the housing 82 and enters the transparent body of the actuator 70 through the various walls 96-108. The light that enters the interior body of the actuator 70 then exits through the diffusive top surface 72 and shines light around the hidden icon on the interior surface of the panel 66 to renders the icon visible through the semitransparent control panel 66.

The protective metal plate 28' functions to prevent the flexible translucent control panel overlay 66 from being stressed by pressure being applied at locations other than the switch actuator locations. The plate 28', being opaque, blocks any light except through the actuator mounting holes.

The releasable connector 80 for connecting the bottom 108 of the actuator 70 to the top of the switch is seen to have a round peg within a square hole. This is mated with a connector on the top of the switch having a complementary square peg with a round hole.

Figure 10:
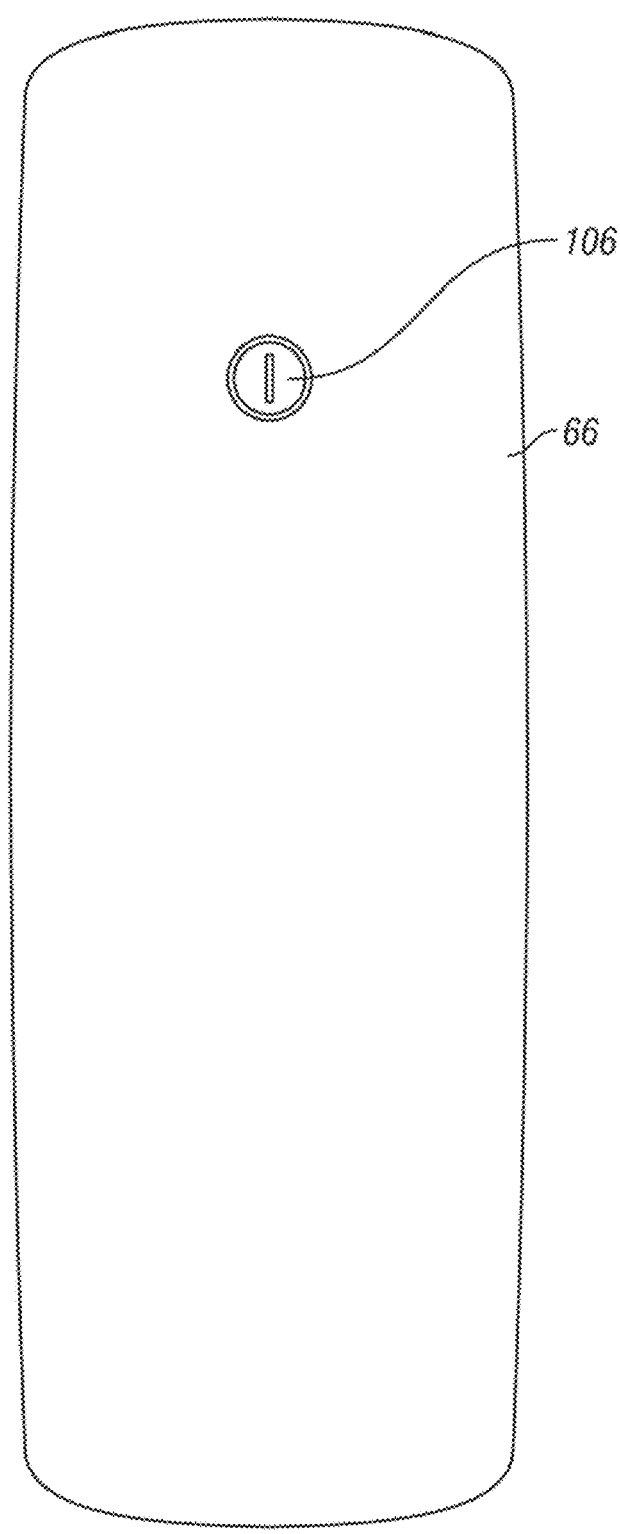
FIG. 10 is a side elevation view of a minimalist embodiment of the hiding overlay of the present invention that covers and hides the hidden brewer function switches, as seen when none of the switches, except the power-on switch, nor the display, are revealed and in which there are no graphics except for provision of the maker trademark, such as FETCO, or the name and the model identification, such as CBS-2052, and the full power-on switch location.

Referring to FIG. 10, in accordance with one embodiment of the invention the control panel overlay has no graphics on its outside surface except a power icon 106 overlying the actuator 70 of the power on switch 39, the name 108 of the maker and the model designation 110. When full power is not on, the lamp 84 of power switch assembly 39 is intermittently energized to provide a flashing indication. When the power on switch 39 is actuated the lamp 84 is energized continuously, and the icon 106 alone provides the location of the switch 39. When none of the other lamps 84 of the other switches are energized, then none of the other switch locations are visible and the switches remain hidden and unrevealed. Only after the reservoir comes up to level and temperature that have been preselected, then all of the brew start switches and the hot water switch are enabled and backlit to reveal their locations.

Figure 11A:
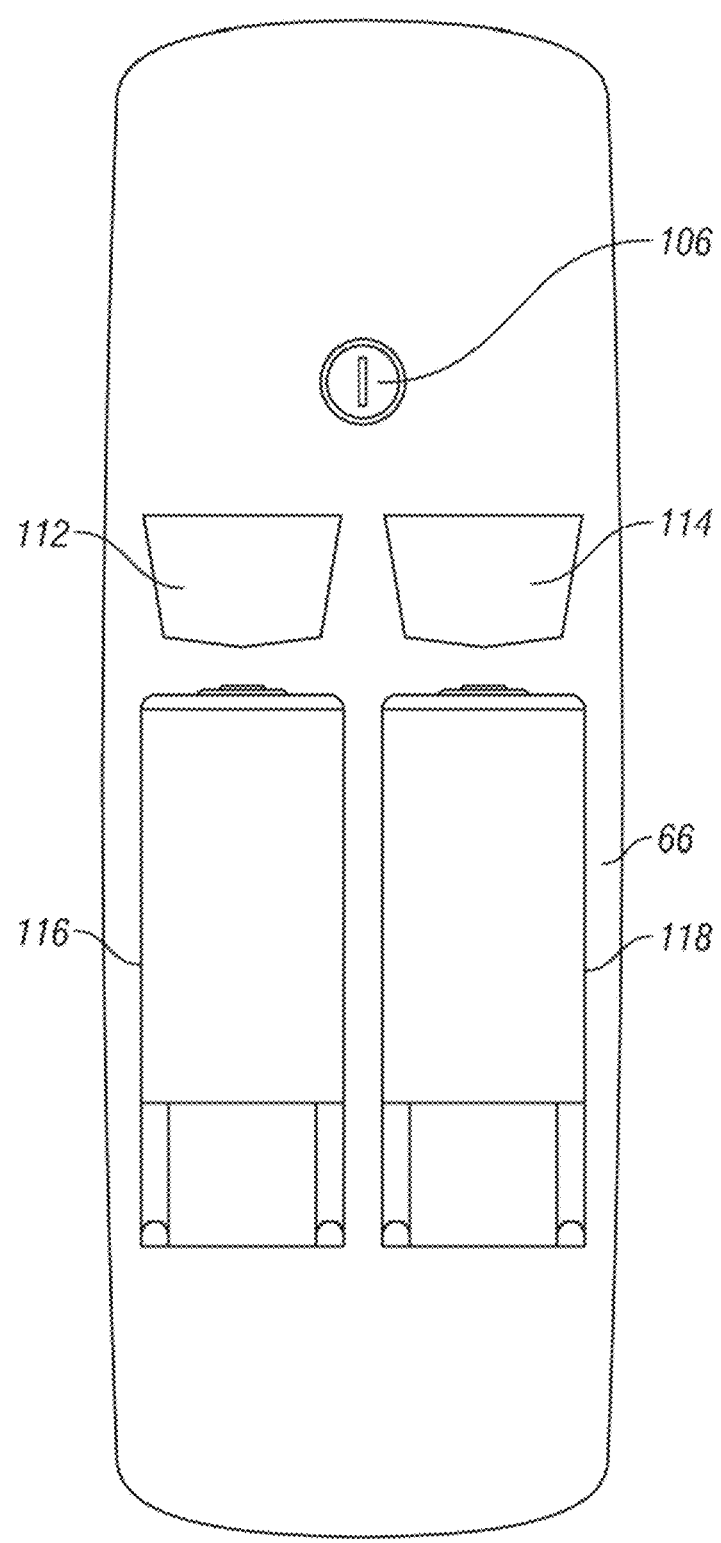
FIG. 11A is another side elevation view similar to that of FIG. 10 of the hiding overlay which hides the hidden switches, when neither any of the switches nor the message display are revealed, but on which graphics are provided to identify the general left and right control panel areas, and the power switch.

However, because users are accustomed to seeing some indication on the control panel of the presence of brewer function switches, other graphics may be provided to indicate the presence of controls even when none of the lamps are energized. Thus, as seen in FIG. 11A, brew basket icons 112 and 114 in the shape of a brew basket are provided as well as a pair of coffee icons 116 and 118 in the shape of a coffee urn. These icons 112, 114, 116 and 118; together with the start switch icon 108, the maker's name 108 and the model designation 110 are all that is seen by the operator in the absence of energizing of any of the hidden switch lamps 84.

Figure 11B:
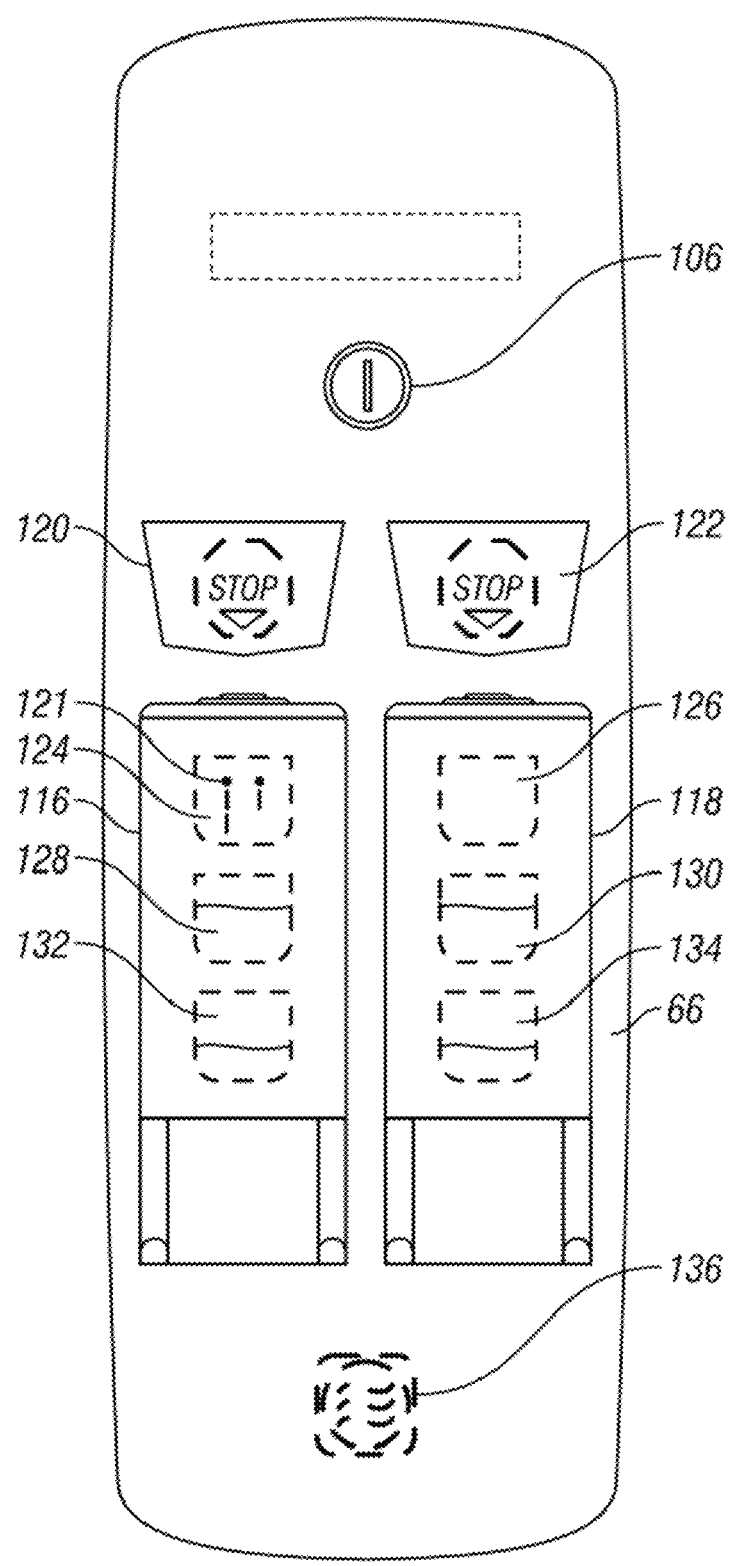
FIG. 11B is a side elevation view of the hiding overlay similar to that of FIG. 11A, but in which the message display unit location which is selectively displayed is shown in broken line, and in which the various switch location and identification images, or "icons", that are revealed only selectively by the brewer controller, are shown by broken line, and the permanently displayed graphics, previously shown only in solid line in FIG. 11A.

However, when all of the lamps 84 are energized, then there are other icons revealed to locate the position of each of the hidden brewer function switches that is enabled. Referring to FIG. 11B, these icons are only on the interior surface of the control panel overlay 66 and cannot be seen unless backlit by the associated lamps 84. These icons are actually in solid line but are shown in broken line to distinguish them from the graphics on the front of the panel 66 that can always be seen.

When the left stop switch 40 and the right stop switch 42 are enabled and their associated lamps are energized, then stop icons 120 and 122, respectively, are made visible. As seen the stop switch icons are contained within the brew basket icons 112 and 114 and are in the standard octagonal shape of a traffic light within which is contained the word "STOP" and an arrowhead pointing downwardly toward the area where the start brew switches are located.

Similarly, when the maximum, medium and minimum quantity brew start switches 50 and 56, 52 and 58, and 54 and 60 are enabled and their associated lamps 84 are energized, then other icons associated with these functions are caused to appear to the operator. These hidden icons 124 and 126, 128 and 130, and 132 and 134, respectively become visible to the operator to mark the location of the associated switch actuators 70 and to provide an indication of the different start brew functions associated with the different start brew switches. As seen, the icons 124 and 126 have a representation of a full container; the icons 128 and 130 have a representation of a container that is two-thirds full, and the icons 132 and 134 have a representation of a container that is only one-third full. These approximately represent the actual ratio of the different preselected quantities of approximately 1½, 1 and ½ gallons of brewed coffee that are made when these different start switches are actuated.

The location and function performed by the hot water dispense switch 48 is represented by an icon 136 that shows waves to represent the water that is dispensed from the hot water dispense valve 49 when the switch 48 is activated.

Figure 11C:
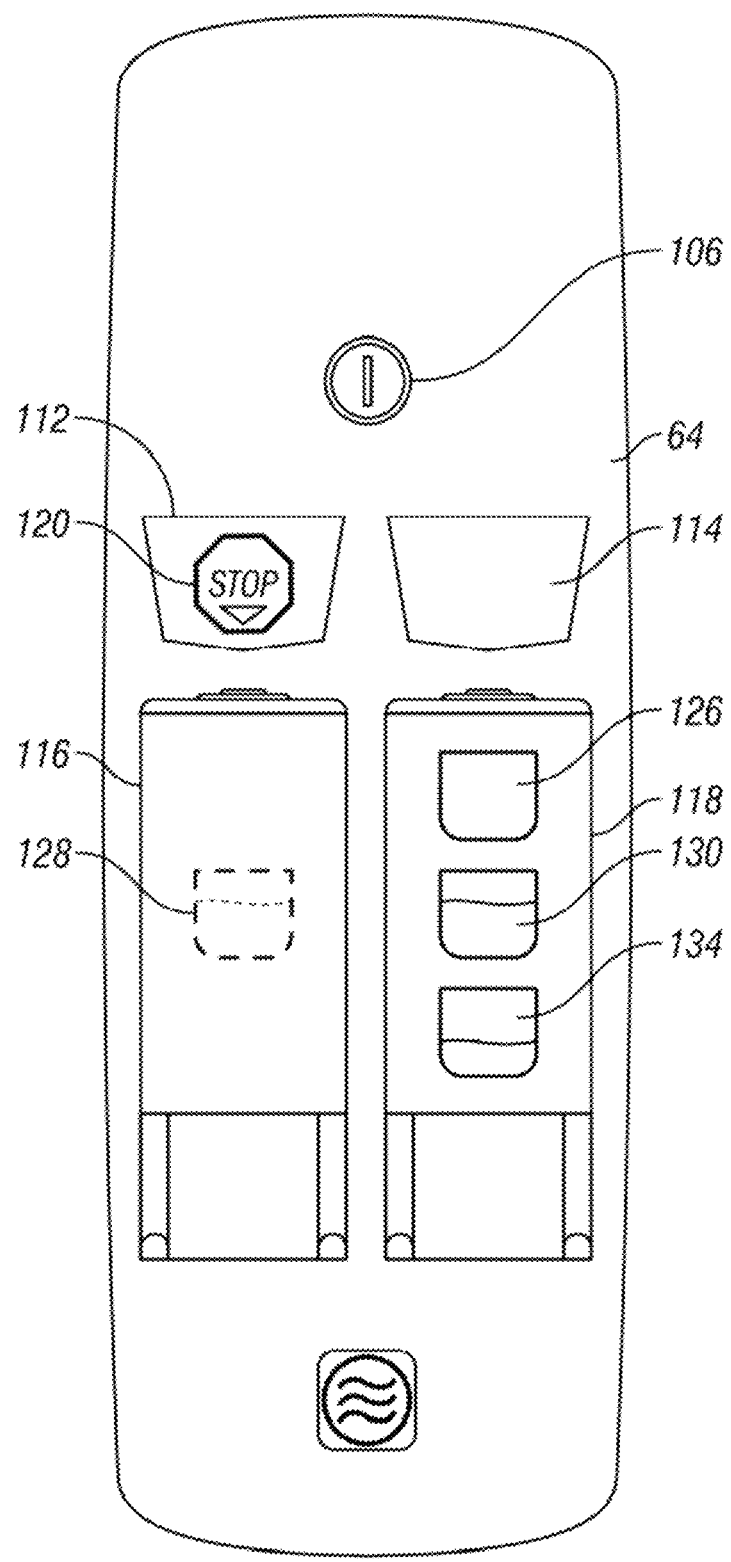
FIG. 11C is another side elevation view of the hiding overlay, as seen by an operator when the medium batch quantity start brew switch for the left side of the brewer has been actuated to place the brewer into brewing status such that, in accordance with the invention, the water dispense switch, the nonselected left side brew start switches and message display unit and the right stop brew switch are not revealed, while the left brew stop switch location and full power on switch location are revealed with continuously on backlights, as indicated by solid line representations of the icons, and the selection of the medium batch quantity start brew switch is revealed by a flashing back light, as indicated by a broken line representation of the icon that is revealed.
Figure 11D:
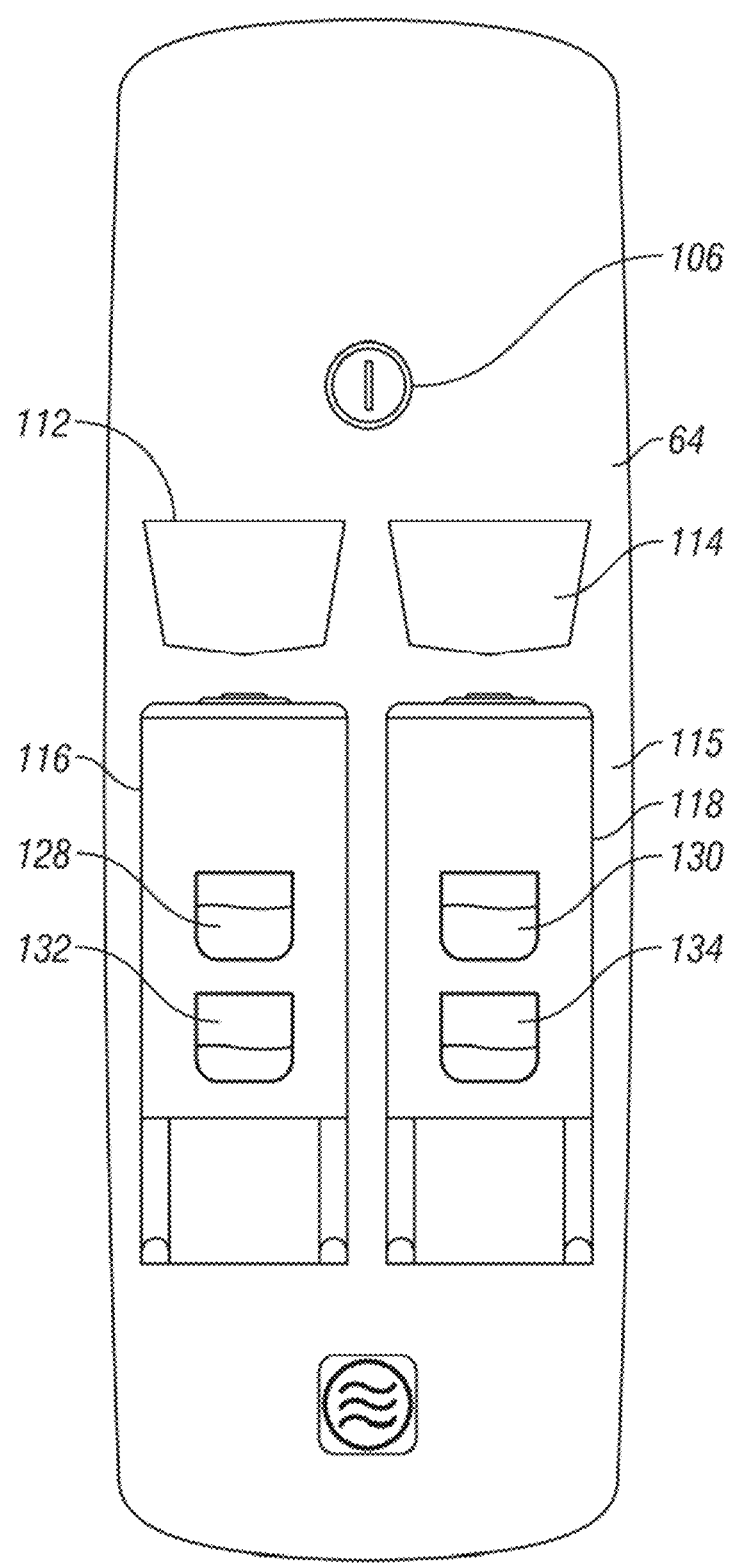
FIG. 11D is another side elevation view of the overlay when no brew cycle is in process but in which due to mode selection, both the left and the right maximum batch quantity brew start switches have been relatively permanently disabled such that their locations are not revealed as are the other brew start switches.

Referring now to FIG. 11C, in accordance with the invention, when any of the brewer function switches are disabled from performing their function, either because of the temporary operating status of the brewer 20 or because of a mode of operation has been preselected in which certain functions associated with the function selection switch are not allowed, then those brewer function switches and their associated hidden icons remain hidden and are not revealed by energizing their associated lamp 84. Thus, for example, referring to FIG. 11C, when there is no brew cycle in process on the right side brewer, the right stop switch 42 has no function to perform and is disabled. Accordingly, as shown, the hidden stop icon 126 is not backlit by the associated lamp 84 and remains hidden to the operator.

Similarly, viewing the left side of the control panel overlay 64, when a brew cycle on the left side of the brewer is in progress, then the hidden left stop brew switch 40 is enabled, and the associated hidden icon 120 is made visible by energizing the lamp 84. In addition, to provide an indication of which quantity is being brewed the backlight of the brew start switch that was actuated to start the brew cycle that is in process, in this case, switch 52 for lighting the icon 128 is intermittently energized to flash the light 52' beneath the icon 128 until the entire brew cycle, including the drip period, is completely over. On the other hand, another brew cycle cannot be started until the one in progress is completed, and so the other two start brew switches 50 and 54 are disabled, and their respectively associated locating hidden icons 124 and 132 remain hidden from the operator.

The hot water dispense switch 48 remains enabled so long as the hot water reservoir is up to temperature and level and its backlight brew cycle the hot water dispense switch 48 is also disabled, and the hidden hot water switch icon 136 is hidden by de-energizing the associated lamp 84. At the conclusion of the brew cycle the flashing of lamp 52' is terminated and all of the lamps of all the preselected brew start switches 50, 52 and 54 are lit continuously.

In the case of a mode being preselected in which some of the operational capabilities of the brewer are relatively permanently disabled, then despite the operational status of the brewer, switches associated with the disabled capability are disabled and their associated lamps 84 are kept off at all times. Thus, for example, reefing to FIG. 11D, if the operational capability of making a maximum quantity of beverage is disabled, then the hidden icons 124 and 126 for making the maximum quantity brew start switches 50 and 56 and the switches themselves remain hidden. This hiding of the switches occurs regardless of the operational status of the brewer. Thus, in FIG. 11D, the start maximum brew hidden icons cannot be seen even though there is no brew cycle in progress, such that the other start brew switches and hot water dispense icons are seen while the stop brew switch icons remain hidden.

The computer 24, FIG. 1, is loaded with software that operates in accordance with the algorithm, or logic flow chart of FIGS. 12A, 12B, 12C and 12D.

Figure 12A:
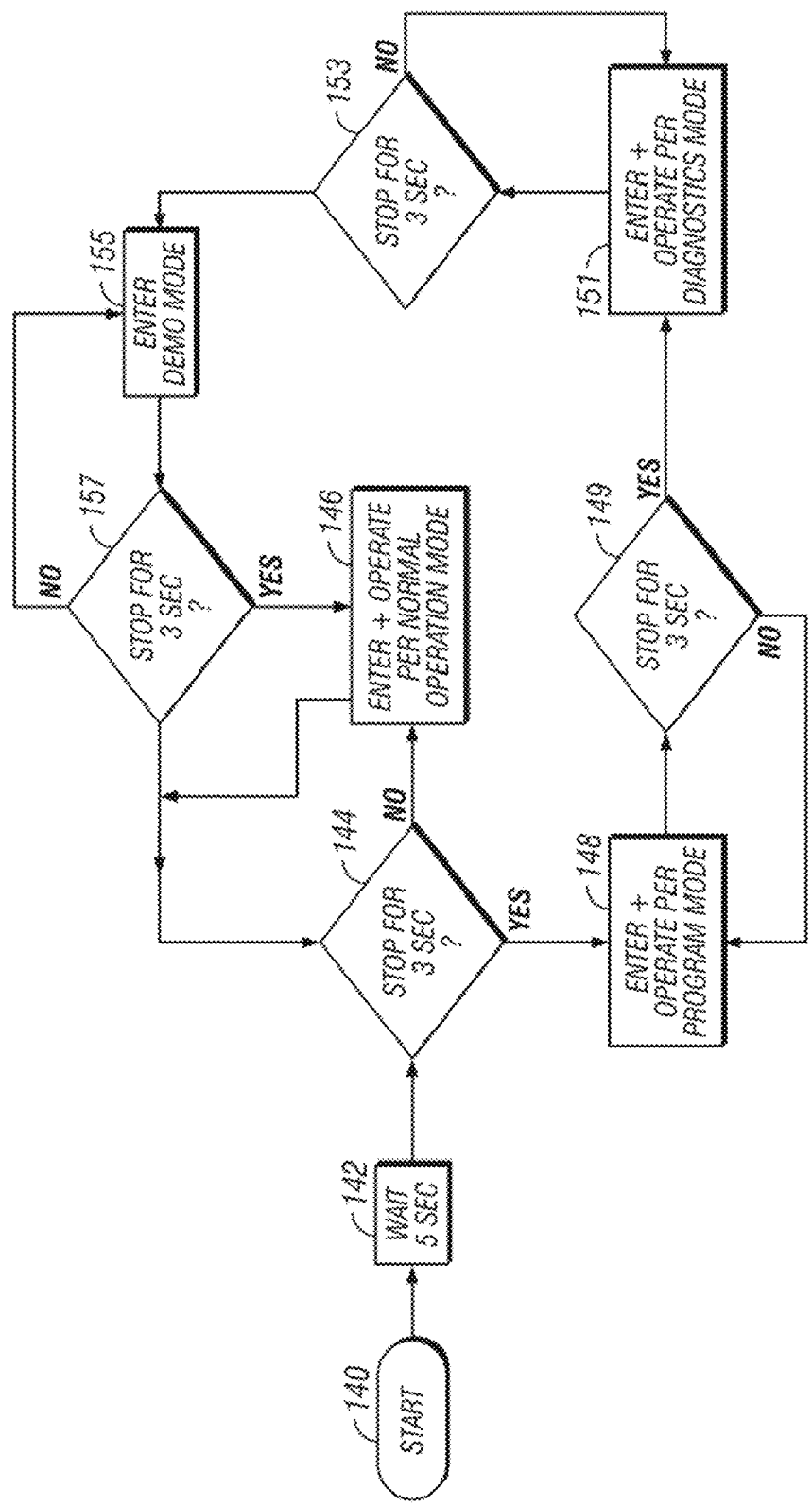
FIG. 12A is a general functional block diagram of the software that is used with the microcomputer of the controller showing the operational and programming subroutines.

Referring to FIG. 12A, after the brewer 20 is connected with a standard AC power source, the program starts in step 140. In step 142, there is a five second delay, to allow all transients to pass and the circuits to settle into their quiescent states. After this, unless the stop brew switch 40 or 42 is held continuously in an actuated state for three seconds, as determined in step 144, the program proceeds to step 146. In step 146, the brewer enters into and is operated in accordance with the normal operation mode in which brewing can occur, as will be explained in detail with reference to FIGS. 12B and 12C.

On the other hand, if the one of the stop brew switches is held actuated for at least three seconds, then the brewer 20 enters into and is operated in accordance with a programming mode in step 148. Entries into the microcomputer 124 are made by pressing the stop switches and the start brew switches to make selections of different modes of operation from a menu of options, as described in detail below with respect to FIG. 12D. These switches are backlit to identify them to the operator as the switches to use for programming.

In accordance with the different modes of operation, one or more of the brewer function switches is relatively permanently disabled, or rendered non-operational. If the user does not expressly exit the programming mode, after a period of thirty seconds without any entries being made while in the program mode, the computer automatically returns to the normal operation mode of step 146. This programming mode begins at start 140. After start 140, the computer waits five second in step 142 and then in step 144 a determination is made as to whether the left hand stop switch 40 was held in an actuated state for at least three seconds. If so, then the computer enters the programming mode in step 146.

Figure 12B:
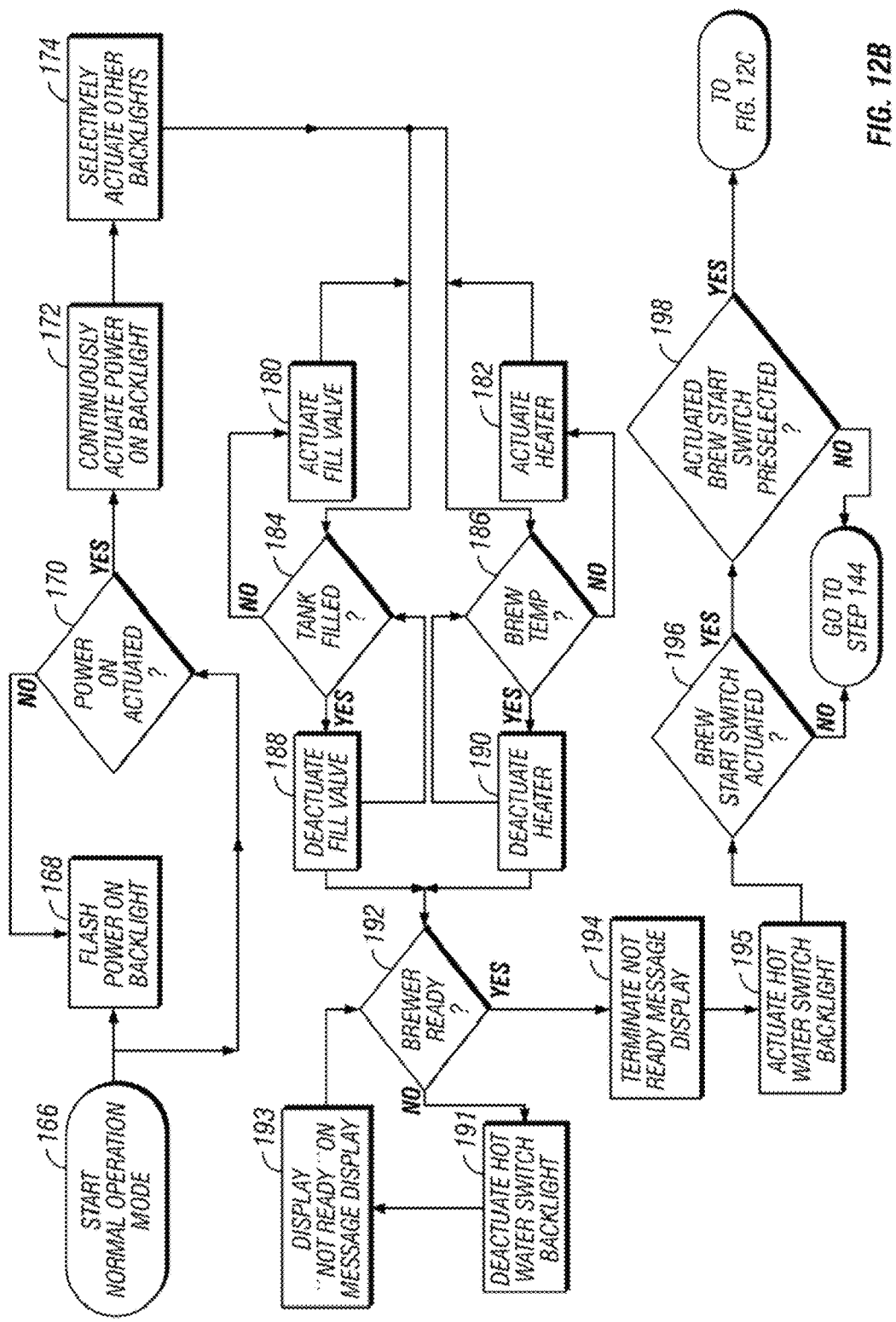
FIGS. 12B and 12C form a detailed composite flow chart of the normal operation mode subroutine of FIG. 12A.
Figure 12C:
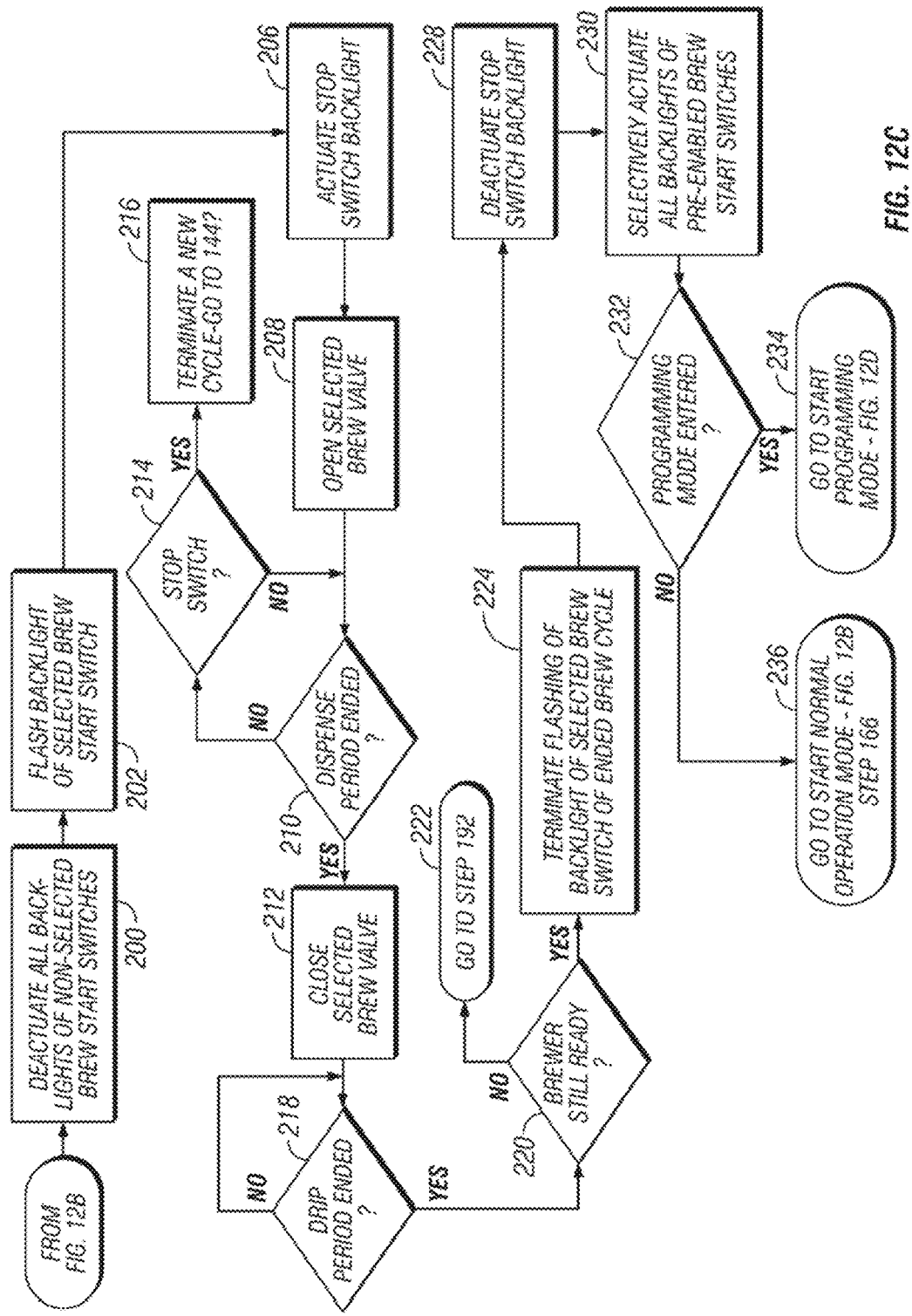
Figure 12D:
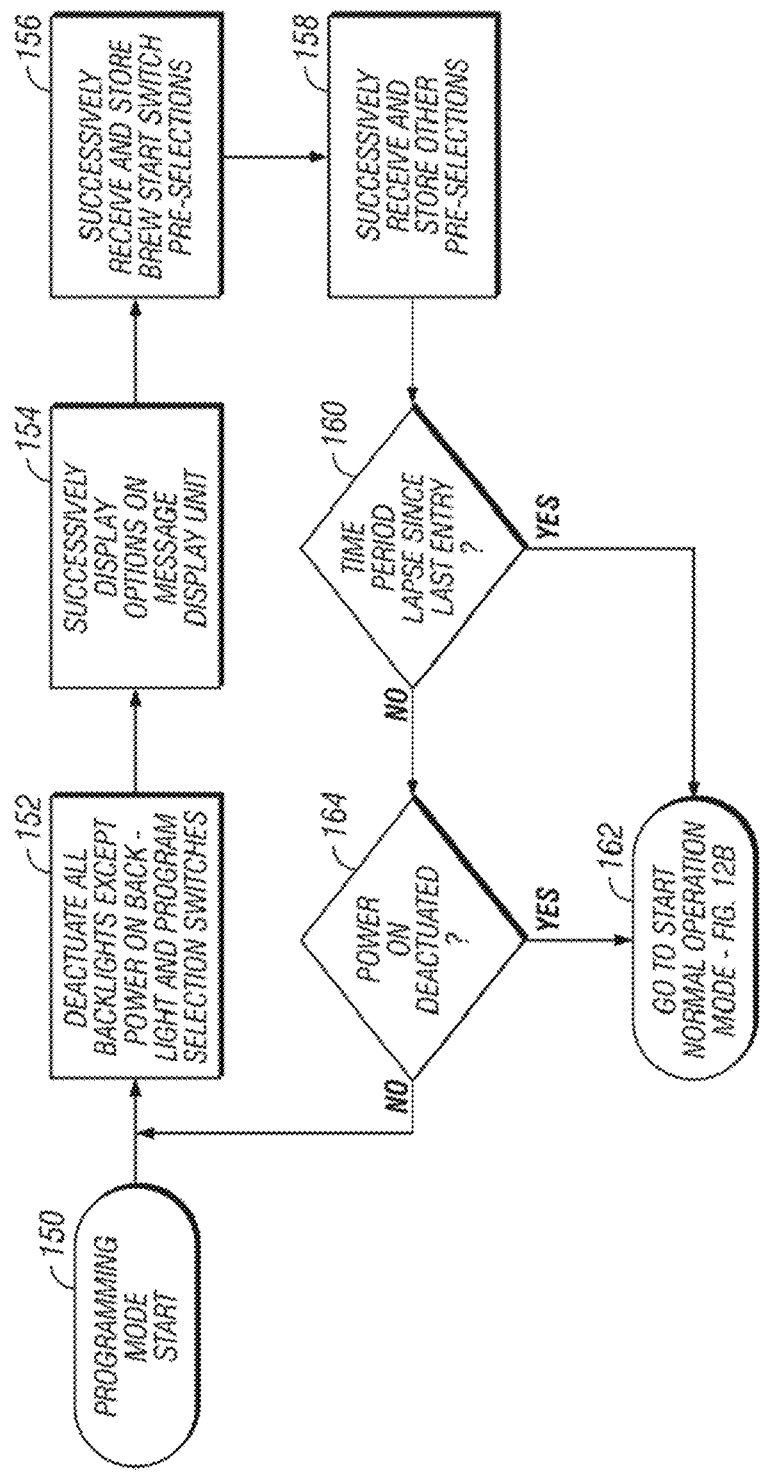
FIG. 12D is a general functional block diagram of the programming mode subroutine of FIG. 12A pursuant to which selected ones of the brew start switch may be relatively permanently disabled, or rendered nonoperational.

Referring to FIG. 12D, after the programming mode is begun in step 150, in step 152, the backlights of all of the switches except the power on switch backlight 39' and the backlight of the stop switch used to enter selections and to navigate through the programming routine. Next, under control of the person programming the brewer for the various different modes of operation, successive options to be selected by the programmer are presented on the message display unit 62 in step 154. In step 156, the microcomputer 24 successively receives and stores preselections of which brew start switches are to be relatively permanently disabled and therefore relatively permanently hidden. In step 158, the computer 24 receives and stores other pre-selections, and in step 160, a determination is made as to whether any new selection entries have been made by the programmer within a preselected time period. If the time period has lapsed, then the computer 24 returns to the normal operation mode in step 162. If the time period has not lapsed, then in step 164 a determination is made as to whether the power on switch has been deactuated. If not, then the programming routine continues. If the power on switch has been deactuated, then the program proceeds to step 162 from which re-actuation of the power on switch 39 is monitored.

The programming mode operates in accordance with the following listing of program steps:
Enter Programming
At POWER UP, hold the STOP key for 3 seconds to enter the program mode.
The first display you will see will pertain to Brew button 1

| Display: | | 0.0 | 0.0.2 (Software Version Number) No scroll - displayed for 3 seconds then go to 1.0 |
|---|---|---|---|
| | 1.0 | On | (Brew Selection) No scroll capabilities for position 1 and 2. Positions 3-6 will scroll On or OFF respectively. |
| | 1.1 | 1.50 | (Brew Volume in GAL) Scroll UP/DOWN from 0.50-2.00 (0.10 increment) |
| | 1.2 | 3.00 | (Brew Time M.SS) Scroll UP/DOWN from 3.00-24.0 (30 second increments) |
| | 1.3 | 0.00 | (Percent bypass) Scroll UP/DOWN from 0.00 to 40.0 (1.00 increments) |
| | 1.4 | 0.00 | (Percent Prewet) Scroll UP/DOWN from 0.00 to 15.0 (1.00 increments |
| | 1.5 | 1.00 | (Prewet Delay M.SS) Scroll UP/DOWN from 0.10 to 5.00 (0.10 increments) |
| | 1.6 | 1.00 | (Drip Delay M.SS) Scroll UP/DOWN from 0.30-6.00 (0.10 increments) |
| | 7 | 200 | (Temperature in Degrees Fahrenheit) Scroll UP/DOWN from 180-208 (1.00 increments) |
| | 8 | A | (Hot Water Service) Scroll UP/DOWN from –A- to On to OFF |
| | 9 | 1 | (Brew at temp) Scroll UP/DOWN from 0-1 (1 = a temp, 0 = any temp) |
| | 14 | 0 | (Enter Diagnostics) |

Scroll UP/DOWN from 0-1 (0 is default and selecting it will take you back to 1.0. If 1 is selected, unit will go to 50)

| 50 | (Water Level) 0 = LOW 1 = HIGH |
|---|---|
| 51 | Reference Probe Resistance) XXX resistance in K Ohms |
| 52 | Reference Probe 0 = ref probe |

-continued

| | | |
|---|---|---|
| | 1 = 33k | |
| | 2 = 68k | |
| 53 | | Current tank tank temp in degrees Fahrenheit) |
| 54 | | (Circuit Board Connected) |
| | 11 | X2, 6 portion |
| | 01 | X2, 4 portion |
| | 10 | X1, 3 portion |
| | 00 | X1, 2 portion |
| 55 | | (Left Brew FR) |
| 56 | | (Right Brew FR) |
| 57 | | (Left Bypass FR) |
| 58 | | (Right Bypass FR) |
| 59 | | Load Defaults |
| 60 | 0 | (Keypad Test) |
| | | Scroll UP/DOWN from 0-1 |
| | | 0 = no keypad test |
| | | 1 = keypad test. Light up all LED's on the board and let the person press all buttons. Display: |
| | | STOP |
| | | S1-S6 |
| | | HW to Exit |
| 61 | 0 | (Relay Test) |
| | | Scroll UP/DOWN from 0-1. If = 1, go to 90 |
| 90 | OFF | (Right/Single Brew) |
| 91 | OFF | (Left Brew) |
| 92 | OFF | (Right/Single Bypass) |
| 93 | OFF | (Left Bypass) |
| 94 | OFF | (Hot Water) |
| 95 | OFF | (Fill Valve) |
| 96 | OFF | (Heater) |
| 97 | OFF | (Left BB Lock) |
| 98 | OFF | (Right BB Lock) |
| 99 | 0_0 | Brew Basket Sensor State |

Enter Programming

At POWER UP, hold the STOP key for 3 seconds to enter the program mode.

The first display you will see will pertain to Brew button 1

| | | |
|---|---|---|
| Display: | 0.0 | 0.0.2 (Software Version Number) |
| | | No scroll - displayed for 3 seconds then go to 1.0 |
| | 1.0 | On (Brew Selection) |
| | | No scroll capabilities for position 1 and 2. Positions 3-6 will scroll On or OFF respectively. |
| | 1.1 | 1.50 (Brew Volume in GAL) |
| | | Scroll UP/DOWN from 0.50-2.00 (0.10 increment) |
| | 1.2 | 3.00 (Brew Time M.SS) |
| | | Scroll UP/DOWN from 3.00-24.0 (30 second increments) |
| | 1.3 | 0.00 (Percent bypass) |
| | | Scroll UP/DOWN from 0.00 to 40.0 (1.00 increments) |
| | 1.4 | 0.00 (Percent Prewet) |
| | | Scroll UP/DOWN from 0.00 to 15.0 (1.00 increments |
| | 1.5 | 1.00 (Prewet Delay M.SS) |
| | | Scroll UP/DOWN from 0.10 to 5.00 (0.10 increments) |
| | 1.6 | 1.00 (Drip Delay M.SS) |
| | | Scroll UP/DOWN from 0.30-6.00 (0.10 increments) |
| | 7 | 200 (Temperature in Degrees Fahrenheit) |
| | | Scroll UP/DOWN from 180-208 (1.00 increments) |
| | 8 | A (Hot Water Service) |
| | | Scroll UP/DOWN from -A- to On to OFF |
| | 9 | 1 (Brew at temp) |
| | | Scroll UP/DOWN from 0-1 (1 = a temp, 0 = any temp) |
| | 14 | 0 (Enter Diagnostics) |

Scroll UP/DOWN from 0-1 (0 is default and selecting it will take you back to 1.0. If 1 is selected, unit will go to 50)

| | | |
|---|---|---|
| 60 | | (Water Level) |
| | | 0 = LOW |
| | | 1 = HIGH |
| 61 | | Reference Probe Resistance) |
| | | XXX resistance in K Ohms |
| 62 | | Reference Probe |
| | | 0 = ref probe |
| | | 1 = 33k |
| | | 2 = 68k |
| 63 | | Current tank temp in degrees Fahrenheit) |
| 64 | | (Circuit Board Connected) |
| | 12 | X2, 6 portion |
| | 01 | X2, 4 portion |
| | 10 | X1, 3 portion |
| | 00 | X1, 2 portion |
| 65 | | (Left Brew FR) |
| 66 | | (Right Brew FR) |
| 67 | | (Left Bypass FR) |
| 68 | | (Right Bypass FR) |
| 69 | | Load Defaults |
| 60 | 0 | (Keypad Test) |
| | | Scroll UP/DOWN from 0-1 |
| | | 0 = no keypad test |
| | | 1 = keypad test. Light up all LED's on the board and let the person press all buttons. Display: |
| | | STOP |
| | | S1-S6 |
| | | HW to Exit |
| 61 | 0 | (Relay Test) |
| | | Scroll UP/DOWN from 0-1. If = 1, go to 90 |
| 90 | OFF | (Right/Single Brew) |
| 91 | OFF | (Left Brew) |
| 92 | OFF | (Right/Single Bypass) |
| 93 | OFF | (Left Bypass) |
| 94 | OFF | (Hot Water) |
| 95 | OFF | (Fill Valve) |
| 96 | OFF | (Heater) |
| 97 | OFF | (Left BB Lock) |
| 98 | OFF | (Right BB Lock) |
| 99 | 0_0 | Brew Basket Sensor State |

Referring to FIGS. 12A and 12B, if the computer 24 does not enter the program mode in step 144, FIG. 12A or if the program mode is terminated at step 164, FIG. 12D, then the start of the normal operation mode begins in step 166. Next in 168, if the power on switch is not actuated, then the backlight 39' is caused to flash and in step 170, the controller monitors for actuation of the power on switch 39. If the power on switch is actuated, then in step 172, the power on backlight 39' is continuously actuated to continue to locate the location of the power on switch while also indicating that the power on switch has been actuated and the brewer is in a full power on status condition. Next, in step 174 the backlights that have been preselected to be operational during the programming stage are selectively actuated based upon the operational status of the brewer.

In step 184, a determination is made as to whether the tank has been filled to a preselected level as sensed by the level sensor 30. If not, in step 180, the fill valve is opened to fill the hot water reservoir. In step 186, a determination is made as to whether the temperature of the water is the preselected temperature, as indicated by the thermostat 34, and, if not, then in step 182, the heater 35 is energized to begin heating the water in the reservoir. During initial startup, when the hot water reservoir has not yet been filled to the preselected level or the temperature has not yet reached the preselected minimum temperature, a "NOT READY" status message is provided on the message display unit 62 in step 193. Whenever the brewer is not ready, in step 191 the hot water switch is disabled and its backlight is deactuated.

In step 188, when the correct level has been reached the fill valve is closed, and in step 190, when the correct temperature is reached the heater 35 is deactuated. When both the level is correct and the temperature is correct, then in step 192 a determination is made that the brewer is ready. When the brewer becomes ready, then in step 194, the not ready message display is terminated and the message display unit 62 returns to a hidden state, and in step 195 the hot water switch is enabled and the backlight is actuated.

With no brew cycle having yet begun, the locations of all the brewer function switches except the stop switches 40 and 42, and any of the brewer start switches that were rendered nonoperational during operational mode programming, are revealed by energizing their associated backlights.

Next, in step 196, a determination is made as to whether any of the start brew switches has been selected. If not, the computer continues to recycle between step 144 and step 196. Once a start brew switch has been selected, in step 198, a determination is made as to whether the selected brew start switch has been programmed to be operational during the programming of the operational modes. If the actuated switch is one that is not nonoperational, then again the controller recycles to step 144. If a brew start switch is actuated and the actuated switch is one that is operational because of the operational mode that has been selected, then the controller proceeds to step 200, FIG. 12C. In step 200 all of the other start brew switches that are on the side of the brewer that has the selected start switch are turned off, and in step 202, the lamp 84 of the selected switch is caused to flash on and off to indicate that a brew cycle is in progress and to also indicate which quantity—large medium or small—is being brewed. In step 206, the lamp 84 for the stop brew switch on side of the brewer of the selected switch is turned on, and in step 208, the appropriate brew valve is opened to pass hot water into the brew basket to start the brew. In step 210, the dispense time associated with the selected start switch is measured to time the opening of the brew valve for the appropriate amount of brew water.

In step 212, after the preselected brew dispense time has lapsed, the selected brew valve is closed to terminate the dispense period of the brew cycle. If not, then in step 214 a determination is made whether the brew stop switch of the side of the brewer of the selected switch is actuated. If the stop switch is actuated, then the brew cycle is ended in step 216 by closing the brew valve and resetting all of the timers and returning to start step 144.

Once it is determined in step 210 that the dispense time period has lapsed, then in step 212 the brew valve is closed. A drip timer is then started and in step 218 a determination is made as to whether the drip period has lapsed. After the drip timer has lapsed, the brew cycle is ended, and in step 220 a determination is made whether the brewer is still ready. If the brewer is not still ready, then in step 222 the controller returns to step 192. If the brewer is still ready, then in step 224 flashing of the lamp 84 of the selected brew start switch is terminated. Next, in step 228 the stop switch backlight 40' or 42' is deacruated. The lamp 84 of the selected start switch is turned on continuously, and the other brew start switches that are enabled by the programming mode are also revealed to the operator in step 230. In step 232, a determination is made of whether the programming mode has been selected. If so, then the program in step 234 returns to start step 150 of the program mode routine of FIG. 12D. If not, then in step 236 the program returns to the start step 166 of the normal operation mode of FIG. 12B, and the cycle is repeated when the next brew start switch is actuated.

While a particular embodiment has been disclosed for purposes of illustration, the invention is not so limited but is defined by the appended claims.

The invention claimed is:

1. In a beverage brewer having a plurality of controllable operational elements needed for brewing a hot beverage, a method of operating the brewer, comprising the steps of:
   providing at a control panel a plural total number of hidden brewer function selection switches respectively associated with a plural total number of different operator selectable brewer functions;
   entering into a non-operational program mode during which the brewer is disabled from utilizing the operational elements for brewing beverage;
   during the non-operational program mode, revealing and using some of the brewer function selection switches for preselecting only one of the plurality of different operational modes of the brewer;
   respectively associating different beverage quantities with different groups of a preselected one or ones of the plural total number of function selection switches, each of said groups having a number of operational function selection switches less than the plural total number of function selection switches;
   during an operational mode, selectively revealing to an operator only the hidden function switches of the group associated with the one mode of operation preselected during the non-operational program mode to an operator in accordance with the mode of operation that has been preselected; and
   controlling the operational elements to perform one of the selectable brewer functions directly in response to actuation of the associated operational function selection switch of the group that has been selectively revealed to the operator.

2. The beverage brewer operating method of claim 1 in which
   some of the plurality of different operator selectable brewer functions include functions of starting brew cycles for making different quantities of beverage, and
   the different preselected modes of operation are respectively associated with the plurality of different operator selectable brewer functions for starting brew cycles for making the different quantities of beverage.

3. The beverage brewer operating method of claim 1 in which the different quantities of beverage associated with the different modes of operation include relatively small, medium and large batch sizes.

4. The beverage brewer operating method of claim 1 including the steps of
   hiding other brewer function switches associated with other functions, and
   selectively revealing the other hidden switches independently of the different preselected modes of operation in response to changing operational conditions of the brewer occurring during different operational phases of a brew cycle during which different ones of the operational brewer elements are automatically controlled.

5. The beverage brewer operating method of claim 4 in which the other functions include at least one of (a) a brewer power-on function, (b) a stop-brew cycle function and (e) a water-dispense function.

6. The beverage brewer operating method of claim 4 including the step of displaying on a hideable message display a message with information needed for making preselections of the different modes of operation.

7. The beverage brewer operating method of claim 6 including the steps of
hiding the message display, and
selectively revealing the message display only when needed for displaying messages during the non-operational program mode for making preselections.

8. The beverage brewer operating method of claim 6 including the steps of
hiding the message display, and
selectively revealing the message display when needed for display of a message.

9. The beverage brewer operation method of claim 1 including the steps of
associating another brew function with another selection switch that is independent of the different modes of operation; and
selectively revealing the at least another hidden function switch in response to a change in operating conditions of the brewer.

10. The beverage brewer operating method of claim 9 including the steps of
associating another brewer function switch with an emergency stop brew cycle function, and
selectively revealing the emergency stop brew function only when the brewer is in a brew cycle.

11. The beverage brewer operating method of claim 9 including the steps of
associating another brewer function switch with a hot water dispense function in which hot water is dispensed from a dispense nozzle, and
selectively revealing the of water dispense function switch only when the brewer is not operating in a brew cycle.

12. The beverage brewer operating method of claim 1 including the steps of
associating another brewer function switch with a full power-on function, and
revealing the full power on switch only when the full power is off.

13. The beverage brewer operating method of claim 1 including the steps of
associating the plurality of function switches with a plurality of different start brew functions for making different quantities of beverage, and
revealing the plurality of hidden function switches when only when the brewer is not already in a brew cycle.

14. The beverage brewer operating method of claim 1 including the steps of
associating the plurality of hidden function switches respectively with a plurality of different brew cycles associated to make a plurality of different quantities of beverage to be brewed, respectively, and
selectively revealing only the preselected ones of the hidden function switches when a brew cycle is not already in progress.

15. The beverage brewer operating system of claim 1 including the steps of
hiding the hidden function switches behind a partially translucent panel through which the hidden function switches cannot be seen under ordinary ambient light conditions, and
selectively revealing means includes controller includes means for selectively lighting the panel adjacent the hidden function switches selected to be revealed, said adjacent lighting being visible through the translucent panel to indicate the location of the selected function switch.

16. The beverage brewer operating method of claim 15 including the step of manually actuating the hidden brewer function switches by pushing, against the panel opposite the switches to press the panel against push button actuators of the brewer function switches.

17. The beverage brewer operating method of claim 15 in which the step of revealing includes the steps of
mounting light sources to the pushbutton switches, and
selectively energizing the sources of light to reveal the locations of the pushbutton switches.

18. The beverage brewer operating method of claim 15 in which the step of selectively lighting includes energizing a separate light source for each of the brewer function switches.

19. The beverage brewing method of claim 1 including the step of disabling all of the plurality of function switches except the preselected ones that have been selectively revealed.

20. In a beverage brewer having a plurality of controllable operational elements needed for brewing a hot beverage, a method of operating the brewer, comprising the steps of:
hiding at a control panel a plural total number of hidden brewer function selection switches respectively associated with a plural total number of different operator selectable brewer functions;
entering into a non-operational program mode during which the brewer is disabled from brewing beverage;
during the non-operational program mode using some of the brewer function selection switches for preselecting one of a plurality of different operational modes of the brewer respectively associated with different groups of a preselected one or ones of the plural total number of function selection switches, each of said groups having a number of operational function selection switches less than the plural total number of function selection switches;
selectively revealing to an operator only the hidden function switches of the group associated with the one mode of operation preselected during the non-operational program mode to an operator in accordance with the mode of operation that has been preselected;
controlling the operation elements to perform one of the selectable brewer functions directly in response to actuation of the associated operational function selection switch that has been selectively revealed to the operator; and
preselecting more than one of the different modes of operation to enable all of the hidden function switches associated with all of the more than one different modes of operation to be revealed simultaneously.

21. In a beverage brewer having a plurality of controllable operational elements needed for brewing a hot beverage, a method of operating the brewer, comprising the steps of:
hiding at a control panel a plural total number of hidden brewer function selection switches respectively associated with a plural total number of different operator selectable brewer functions;
entering into a non-operational program mode during which the brewer is disabled from brewing beverage;
during the non-operational program mode using some of the brewer function selection switches for preselecting one of a plurality of different operational modes of the brewer respectively associated with different groups of a preselected one or ones of the plural total number of function selection switches, each of said groups having a number of operational function selection switches less than the plural total number of function selection switches;

selectively revealing to an operator only the hidden function switches of the group associated with the one mode of operation preselected during the non-operational program mode to an operator in accordance with the mode of operation that has been preselected:

controlling the operation elements to perform one of the selectable brewer functions directly in response to actuation of the associated operational function selection switch that has been selectively revealed to the operator;

hiding other brewer function switches associated with other functions;

selectively revealing the other hidden switches independently of the different preselected modes of operation in response to changing operational conditions of the brewer occurring during different phases of a brew cycle during which different ones of the operational brewer elements are automatically controlled;

displaying on a hideable message display a message with information needed for making preselections of the different modes of operation;

revealing another brewer function switch regardless of the preselected operating mode to enable entry into the non-operational program mode for programming the operation of the brewer using messages on the message display; and revealing the message display only when there is a message to be displayed.

22. In a beverage brewer having a plurality of controllable operational elements needed for brewing a hot beverage, a method of operating the brewer, comprising the steps of:

hiding at a control panel a plural total number of hidden brewer function selection switches respectively associated with a plural total number of different operator selectable brewer functions;

entering into a non-operational program mode during which the brewer is disabled from brewing beverage;

during the non-operational program mode using some of the brewer function selection switches for preselecting one of a plurality of different operational modes of the brewer respectively associated with different groups of a preselected one or ones of the plural total number of function selection switches, each of said groups having a number of operational function selection switches less than the plural total number of function selection switches;

selectively revealing to an operator only the hidden function switches of the group associated with the one mode of operation preselected during the non-operational program mode to an operator in accordance with the mode of operation that has been preselected;

controlling the operation elements to perform one of the selectable brewer functions directly in response to actuation of the associated operational function selection switch that has been selectively revealed to the operator;

revealing another brewer function switch regardless of the preselected operating mode to enable entry into the non-operational program mode for programming the operation of the brewer using messages on a hideable message display;

enabling the hideable message display only when there is a message to be displayed; and displaying on the hideable message display a message with information needed for making preselections of the different modes of operation; and in which the step of enabling the message display to be revealed includes the step of actuating a hidden function switch that is revealable regardless of the different modes of operation that have been preselected.

23. In a beverage brewer having a plurality of controllable operational elements needed for brewing a hot beverage, a method of operating the brewer, comprising the steps of:

associating a plurality of hidden function selection switches of an operator control panel with a plurality of different operator selectable brewer functions;

selectively entering into a non-operational program mode during which the brewer is disabled from brewing beverage to preselect one of a plurality of operational modes associated with different quantities of beverage to be made, each of said operational modes including a plurality of phases of operation associated with different periods of an automatic brew cycle; and selectively revealing through means of a controller only selected ones of the hidden function switches to an operator in accordance with both the different modes of operation preselected during the non-operational program mode, and the different phases of operation of the brewer within each of the different modes.

24. The beverage brewer of claim 23 in which some of the plurality of different operator selectable brewer functions include starting different brew cycles for making different quantities of beverage, and the controller selectively reveals the start brew cycle function switches only when the operating status is other than a brewing-in-process status.

25. The beverage brewer operating method of claim 23 in which the brewer functions include at least one of (a) a brewer power-on function, (b) a stop brew cycle function, and (c) a water-dispense function and (d) a start-brew function.

26. The beverage brewer operating method of claim 23 including the steps of programming the brewer to operate in different modes of operation, and using at least one of the function switches for inputting programming information.

27. The beverage brewer operating method of claim 23 in which the operator control panel has a message display for displaying information needed for programming the controller and including the steps of hiding the message display, and selectively revealing the message display only when needed for programming.

28. The beverage brewer operating method of claim 23 including the steps of hiding a hidden message display behind a control panel, and selectively revealing at least a portion of the hidden message display.

29. The beverage brewer operating method of claim 28 including the step of revealing the message display only when there is a message to be displayed.

30. The beverage brewer operating, method of claim 23 including the steps of associating one of the brewer function switches with an emergency stop-brew cycle function, and selectively revealing the one of the brewer function switches associated with the emergency stop-brew function only when the brewer is in a brew cycle.

31. The beverage brewer operating method of claim 23 including the steps of
associating one the brewer function switches with a hot water dispense function in which hot water is dispensed from a dispense nozzle, and
selectively revealing the hot water-dispense function switch only when the brewer is not operating in a brew cycle.

32. The beverage brewer operating method of claim 23 including the step of
associating at least one of the plurality of function switches with a start-brew function for making an associated quantity of beverage, and
revealing the star-brew function switch only when the brewer is not currently in a brew cycle.

33. The beverage brewer operating method of claim 32 including the steps of
associating at least another one of the plurality of function switches with a start-brew function for making another associated quantity of beverage different from the one quantity of beverage, and
revealing both the one and the other hidden start brew switch when the brewer is not currently in a brew cycle.

34. The beverage brewer operating method of claim 33 including the steps of
preselecting different modes of operation in which less than all of the one and the other start brew start switches are enabled to start a brew cycle, and
selectively disabling the revealing means from revealing any of the one and the other hidden brew start switches that is not enabled.

35. The beverage brewer operating method of claim 23 including the step of
hiding the hidden function switches behind a partially translucent panel through which the hidden function switches cannot be seen under ordinary ambient light conditions, and the step of selectively revealing includes
the step of selectively lighting the panel adjacent the hidden function switches selected to be revealed, said light being visible through the translucent panel to indicate the location of the selected function switch.

36. The beverage brewer operating method of claim 35 including the steps of actuating the hidden function switches by pushing the translucent panel opposite a push button actuator to press the panel against the push button actuator of the hidden function switches.

37. The beverage brewer operating method of claim 35 including the steps of having the pushbutton switches carry a source of light that is energized by the revealing means to reveal the location of the pushbutton switch.

38. The beverage brewer operating method of claim 37 in which the selectively lighting means includes a separate light source for each of the brewer function switches.

39. The beverage brewer operating method of claim 23 including the steps of
preselecting one of a plurality of different modes of brewing operation, and
relatively permanently disabling the hidden function selection switches that are not associated with any functions performed during the mode of brewing operation that has been selected.

40. The beverage brewing operating method of claim 39 including the step of relatively permanently disabling the selectively revealing means from revealing the relatively permanently disabled function switches that are not associated with any junctions.

41. The beverage brewing operating method of claim 40 including the step of selectively enabling all of the function switches that have not been disabled due to the preselected mode to be selectively revealed in accordance with changing status of the brewer during normal operation in the preselected mode of brewing.

42. The beverage brewing method of claim 23 including the steps
associating one of the brewer function switches with a fill power-on function, and
selectively revealing the full power-on switch only when full power is off.

* * * * *